US012585334B2

(12) United States Patent
Lv et al.

(10) Patent No.: US 12,585,334 B2
(45) Date of Patent: Mar. 24, 2026

(54) PALM-BASED HUMAN-COMPUTER INTERACTION METHOD AND APPARATUS, DEVICE, MEDIUM, AND PROGRAM PRODUCT

(71) Applicant: Tencent Technology (Shenzhen) Company Limited, Shenzhen (CN)

(72) Inventors: Zhongfang Lv, Shenzhen (CN); Runzeng Guo, Shenzhen (CN); Jiayu Huang, Shenzhen (CN); Yin-Kai Lee, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/619,035

(22) Filed: Mar. 27, 2024

(65) Prior Publication Data

US 2024/0241587 A1 Jul. 18, 2024

Related U.S. Application Data

(63) Continuation of application No. PCT/CN2023/117199, filed on Sep. 6, 2023.

(30) Foreign Application Priority Data

Sep. 29, 2022 (CN) .......................... 202211196351.5

(51) Int. Cl.
*G06F 3/01* (2006.01)
*G06V 40/13* (2022.01)

(52) U.S. Cl.
CPC .............. *G06F 3/017* (2013.01); *G06V 40/13* (2022.01)

(58) Field of Classification Search
CPC ...................................................... G06F 3/017
See application file for complete search history.

(56) References Cited

U.S. PATENT DOCUMENTS 7,580,552 B2 * 8/2009 Yoshizu ............. G06V 40/1312
340/5.82
9,602,806 B1 3/2017 Stafford et al.
(Continued)

FOREIGN PATENT DOCUMENTS

CN 102692995 A 9/2012
CN 103139627 A 6/2013
(Continued)

OTHER PUBLICATIONS

Tencent Technology, ISR, PCT/CN2023/117199, Dec. 4, 2023, 2 pgs.

*Primary Examiner* — Bipin Gyawali
(74) *Attorney, Agent, or Firm* — Morgan, Lewis & Bockius LLP

(57) ABSTRACT

This application discloses a palm-based human-computer interaction method performed by a computer device. The method includes: obtaining, by a palm-based interaction device, sensor data of a palm that is captured by at least two proximity sensors, the at least two proximity sensors being disposed in an array on the palm-based interaction device; recognizing a hovering interaction action of the palm based on the sensor data of the palm that is captured by the at least two proximity sensors; and performing a response operation for the hovering interaction action. This application provides a new interaction manner. A proximity sensor recognizes a hovering interaction operation performed by a palm, so that a user can control a palm-based interaction device without touching or any physical contact. This improves efficiency of interaction.

20 Claims, 10 Drawing Sheets

(56)  References Cited

U.S. PATENT DOCUMENTS

| | | | | |
|---|---|---|---|---|
| 2008/0168403 | A1 | 7/2008 | Westerman et al. | |
| 2009/0139778 | A1 | 6/2009 | Butler et al. | |
| 2011/0312349 | A1* | 12/2011 | Forutanpour | G06F 1/1626 |
| | | | | 455/566 |
| 2012/0245886 | A1* | 9/2012 | Zhang | G06F 3/04883 |
| | | | | 702/150 |
| 2014/0267025 | A1* | 9/2014 | Kim | G06F 3/04886 |
| | | | | 345/156 |
| 2015/0229849 | A1* | 8/2015 | Shin | G06F 3/0304 |
| | | | | 348/207.1 |
| 2015/0277566 | A1* | 10/2015 | Musgrave | G06F 3/017 |
| | | | | 345/156 |
| 2016/0086181 | A1* | 3/2016 | Candelore | G06Q 20/341 |
| | | | | 705/16 |
| 2017/0097413 | A1* | 4/2017 | Gillian | G01S 7/4004 |
| 2018/0040248 | A1* | 2/2018 | Bigham | B60R 1/12 |
| 2018/0059784 | A1 | 3/2018 | Billau et al. | |
| 2020/0189413 | A1* | 6/2020 | Fagan | B60L 53/18 |
| 2022/0041120 | A1* | 2/2022 | Chung | G09F 7/18 |
| 2023/0401884 | A1* | 12/2023 | Ashimine | H04N 23/56 |
| 2024/0257562 | A1* | 8/2024 | Yuan | G06V 40/60 |

FOREIGN PATENT DOCUMENTS

| | | | |
|---|---|---|---|
| CN | 106598371 | A | 4/2017 |
| CN | 113515987 | A | 10/2021 |
| CN | 115079821 | A | 9/2022 |
| WO | WO 2014085277 | A1 | 6/2014 |

* cited by examiner

PALM-BASED HUMAN-COMPUTER INTERACTION METHOD AND APPARATUS, DEVICE, MEDIUM, AND PROGRAM PRODUCT

CROSS-REFERENCE TO RELATED APPLICATIONS

This application is a continuation application of PCT Patent Application No. PCT/CN2023/117199, entitled "PALM-BASED HUMAN-COMPUTER INTERACTION METHOD AND APPARATUS, DEVICE, MEDIUM, AND PROGRAM PRODUCT" filed on Sep. 6, 2023, which claims priority to Chinese Patent Application No. 202211196351.5, entitled "PALM-BASED HUMAN-COMPUTER INTERACTION METHOD AND APPARATUS, DEVICE, MEDIUM, AND PROGRAM PRODUCT" filed on Sep. 29, 2022, all of which is incorporated by reference in its entirety.

FIELD OF THE TECHNOLOGY

Embodiments of this application relate to the field of computer technologies, and in particular, to a palm-based human-computer interaction method and apparatus, a device, a medium, and a program product.

BACKGROUND OF THE DISCLOSURE

With development of computer technologies, manners of human-computer interaction become increasingly diversified.

Some terminals are equipped with a touchscreen. The terminal captures, through the touchscreen, a trigger operation performed by a user, and transmits the trigger operation to a server through a network, to implement human-computer interaction.

When a user interacts with some terminals with a small screen, how to ensure accurate interaction between the user and the terminal is an important problem that urgently needs to be resolved.

SUMMARY

This application provides a palm-based human-computer interaction method and apparatus, a device, a medium, and a program product. The technical solutions are as follows:

According to an aspect of this application, a palm-based human-computer interaction method is performed by a computer device, and the method including:

obtaining sensor data of a palm that is captured by at least two proximity sensors, the at least two proximity sensors being disposed in an array on the palm-based interaction device;

recognizing a hovering interaction action based on the sensor data of the palm that is captured by the at least two proximity sensors; and performing a response operation for the hovering interaction action.

According to another aspect of this application, a computer device is provided, the computer device including a processor, a memory, and at least two proximity sensors, the at least two proximity sensors capturing sensor data of a palm and storing the sensor data of the palm in the memory, the memory storing at least one computer program, and the at least one computer program being loaded and executed by the processor to implement the palm-based human-computer interaction method according to the foregoing aspects.

According to another aspect of this application, a non-transitory computer-readable storage medium is provided, the computer-readable storage medium storing at least one computer program, and the at least one computer program being loaded and executed by a processor of a computer device and causing the computer device to implement the palm-based human-computer interaction method according to the foregoing aspects.

The technical solutions provided in this application have at least the following beneficial effect:

At least two proximity sensors are disposed in an array on a palm-based interaction device. The at least two proximity sensors capture sensor data of a palm. A hovering interaction action of the palm may be recognized based on the sensor data, and a response operation for the hovering interaction action may be performed. In this way, a user can control the palm-based interaction device without touching or any physical contact. This provides a new manner of interaction between a user and a device, and can improve efficiency of interaction between a user and a device.

DESCRIPTION OF EMBODIMENTS

Figure 1:
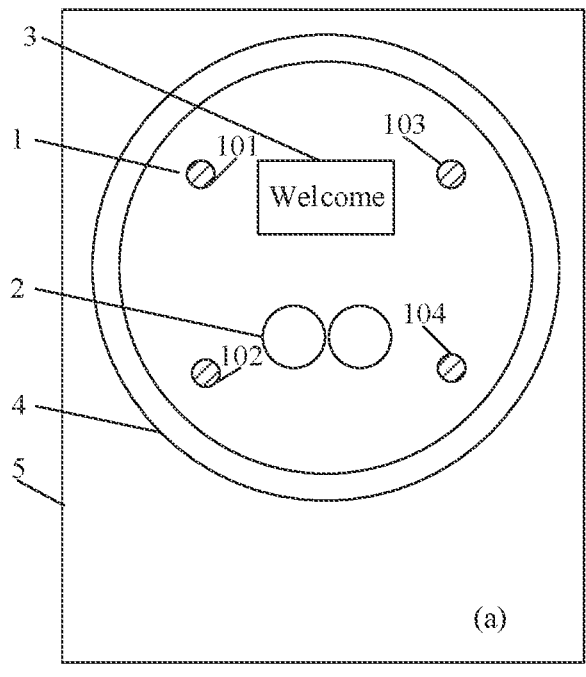
FIG. 1 is a schematic diagram of a palm-based human-computer interaction method according to an exemplary embodiment of this application.
Figure 1:
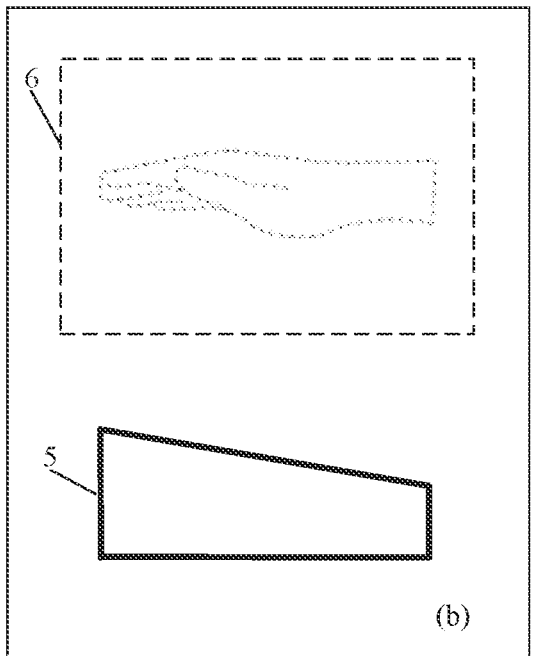

First, several terms included in the embodiments of this application are briefly described:

Artificial intelligence (AI) involves a theory, a method, a technology, and an application system that use a digital computer or a machine controlled by a digital computer to simulate, extend, and expand human intelligence, perceive an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, to enable the machines to have functions of perception, reasoning, and decision-making.

The AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

A cloud technology is a hosting technology that integrates a series of resources such as hardware, software, and network resources in a wide area network or a local area network to implement data computing, storage, processing, and sharing.

The cloud technology is a general term for a network technology, an information technology, an integration technology, a management platform technology, an application technology, and the like that are based on application of a cloud computing business model, and may constitute a resource pool for use on demand and therefore is flexible and convenient. A cloud computing technology is to become an important support. A background service of a technology network system requires a large number of computing and storage resources, such as video websites, picture websites, and more portal websites. With advanced development and application of the Internet industry, in the future, each object may have its own identifier, and needs to be transmitted to a background system for logical processing. Data at different levels is to be processed separately. All types of industry data require a strong system support, which can be implemented only through cloud computing.

Cloud computing is a computing model that distributes computing tasks to a resource pool including a large number of computers, so that various application systems can obtain computing power, storage space, and information services according to requirements. A network that provides resources is referred to as a "cloud". Resources in the "cloud" seem infinitely scalable to a user, and may be obtained at any time, used on demand, expanded at any time, and paid per use.

As a basic capability provider for cloud computing, a cloud computing resource pool, cloud platform for short, usually referred to as an infrastructure as a service (IaaS) platform, is established, and a plurality of types of virtual resources are deployed in the resource pool for external customers to choose to use. The cloud computing resource pool mainly includes a computing device (a virtual machine including an operating system), a storage device, and a network device.

Through division based on logical functions, a platform as a service (PaaS) layer may be deployed above an IaaS layer, and then a software as a service (SaaS) layer is deployed above the PaaS layer, or the SaaS may be directly deployed above the IaaS. The PaaS is a software running platform, for example, a database or a World Wide Web (Web) container. The SaaS is a variety of service software, for example, a web portal or a group SMS message transmitter. Generally, the SaaS and the PaaS are upper layers relative to the IaaS.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technology usually includes image processing, image recognition, image semantic comprehension, image retrieval, video processing, video semantic comprehension, video content/behavior recognition, three-dimensional (3D) object reconstruction, a 3D technology, virtual reality, augmented reality, simultaneous localization and mapping, and the like, and further includes common biometric feature recognition technologies.

The embodiments of this application provide a schematic diagram of a palm-based human-computer interaction method. As shown in FIG. 1, the method is applied to a palm-based interaction device 5 equipped with proximity sensors, and the method may be performed by the palm-based interaction device 5.

For example, as shown in a diagram (a) in FIG. 1, the palm-based interaction device 5 includes a proximity sensor 1, a camera 2, a display screen 3, and an aperture 4. The palm-based interaction device 5 obtains sensor data of a palm that is captured by at least two proximity sensors disposed in an array, and recognizes a hovering interaction action of the palm based on the sensor data of the palm that is captured by the at least two proximity sensors. The palm-based interaction device 5 performs a response operation for the hovering interaction action.

The proximity sensor 1 includes four proximity sensors: an upper-left proximity sensor 101, a lower-left proximity sensor 102, an upper-right proximity sensor 103, and a lower-right proximity sensor 104.

In some embodiments, in the case of four proximity sensors, the four proximity sensors are arranged in a rectangular shape at an upper left location, a lower left location, an upper right location, and a lower right location; or the four proximity sensors are arranged in a rhombic shape at an upper location, a lower location, a left location, and a right location. However, this does not constitute a limitation. This is not specifically limited in the embodiments of this application.

The aperture 4 is in a ring shape, and the aperture 4 encloses the proximity sensor 1, the camera 2, and the display screen 3. The proximity sensor 1 is arranged in a rectangular shape at an upper left location, a lower left location, an upper right location, and a lower right location. The display screen 3 is in a rectangular shape.

The aperture 4 is configured to assist in implementing the palm-based human-computer interaction method. For example, a range of interaction is determined based on a range of the aperture 4, and an operator performs the hovering interaction action within the range of the aperture 4 or a first range beyond the aperture 4 by using a circle center of the aperture 4 as a center, or a result of interaction between the palm and the palm-based interaction device 5 is indicated by a color or brightness change of the aperture 4 during hovering interaction. For example, the aperture 4 blinks once after the interaction between the palm and the palm-based interaction device 5 succeeds, or the aperture 4 continuously blinks after the interaction between the palm and the palm-based interaction device 5 fails.

For example, the hovering interaction action includes an offset swipe action and/or a forward/backward tap action.

As shown in a diagram (b) in FIG. 1, the hovering interaction action is an interaction action triggered in a hovering region 6 above the palm-based interaction device 5. That is, the hovering interaction action implements a control operation on the palm-based interaction device 5 without touching the screen or a button.

In some embodiments, the offset swipe action includes at least one of a left-to-right swipe, a right-to-left swipe, a top-to-bottom swipe, a bottom-to-top swipe, and an oblique swipe, but is not limited thereto. This is not specifically limited in the embodiments of this application. For example, when two proximity sensors are distributed at an upper location and a lower location, the offset swipe action includes the top-to-bottom swipe and/or the bottom-to-top swipe; when two proximity sensors are distributed at a left location and a right location, the offset swipe action includes the left-to-right swipe and/or the right-to-left swipe; when two proximity sensors are distributed at an upper left location and a lower right location, the offset swipe action includes at least one of the left-to-right swipe, the right-to-left swipe, the top-to-bottom swipe, the bottom-to-top swipe, an upper left-to-lower right swipe, and a lower right-to-upper left swipe; or when two proximity sensors are distributed at a lower left location and an upper right location, the offset swipe action includes at least one of the left-to-right swipe, the right-to-left swipe, the top-to-bottom swipe, the bottom-to-top swipe, a lower left-to-upper right swipe, and an upper right-to-lower left swipe.

For another example, when three proximity sensors are distributed at locations in a triangular shape, the offset swipe action includes at least one of the left-to-right swipe, the right-to-left swipe, the top-to-bottom swipe, and the bottom-to-top swipe; when three proximity sensors are distributed at an upper left location, a lower left location, and an upper right location, or distributed at a lower left location, an upper right location, and a lower right location, the offset swipe action includes at least one of the left-to-right swipe, the right-to-left swipe, the top-to-bottom swipe, the bottom-totop swipe, a lower left-to-upper right swipe, and an upper right-to-lower left swipe; or when three proximity sensors are distributed at an upper left location, a lower left location, and a lower right location, or distributed at an upper left location, an upper right location, and a lower right location, the offset swipe action includes at least one of the left-to-right swipe, the right-to-left swipe, the top-to-bottom swipe, the bottom-to-top swipe, an upper left-to-lower right swipe, and a lower right-to-upper left swipe.

For another example, when four proximity sensors are arranged in a rectangular shape at an upper left location, a lower left location, an upper right location, and a lower right location, the offset swipe action includes at least one of the left-to-right swipe, the right-to-left swipe, the top-to-bottom swipe, the bottom-to-top swipe, an upper left-to-lower right swipe, a lower right-to-upper left swipe, a lower left-to-upper right swipe, and an upper right-to-lower left swipe; or when four proximity sensors are arranged in a rhombic shape at an upper location, a lower location, a left location, and a right location, the offset swipe action includes at least one of the top-to-bottom swipe, the bottom-to-top swipe, the left-to-right swipe, and the right-to-left swipe.

In some embodiments, the forward/backward tap action is a mid-air action of the palm moving close to or away from the palm-based interaction device 5.

For example, the palm-based interaction device 5 detects the offset swipe action and performs a first response operation for the offset swipe action, or the palm-based interaction device 5 detects the forward/backward tap action and performs a second response operation for the forward/backward tap action.

In some embodiments, the palm-based interaction device 5 determines a swipe direction of the offset swipe action based on an action parameter value of the offset swipe action in the sensor data, and performs the first response operation based on the swipe direction. For example, the first response operation includes a switching operation, the palm-based interaction device 5 determines a swipe direction of the offset swipe action based on an action parameter value of the offset swipe action, and the palm-based interaction device 5 performs the switching operation based on the swipe direction.

For example, steps of determining the swipe direction include: in response to that the palm enters a first location region, determining a location of the palm in the first location region as a starting point; in response to that the palm moves from the first location region to a second location region, determining a location of the palm in the second location region as an ending point; and when time taken by the palm to move from the starting point to the ending point is less than a first time threshold, determining a direction from the starting point to the ending point as the swipe direction.

In other words, when the palm enters the first location region, the location of the palm in the first location region is determined as the starting point; when the palm enters the second location region, the location of the palm in the second location region is determined as the ending point; and when the time taken by the palm to move from the starting point to the ending point is less than the first time threshold, the direction from the starting point to the ending point is determined as the swipe direction corresponding to the offset swipe action.

In a hovering range above the aperture, a range within which a distance from a plane to which the aperture belongs is greater than a first distance and less than a second distance is determined as a first measurement region. The first measurement region is further divided into first measurement regions of proximity sensors on different sides, for example, a first measurement region of the proximity sensor 101 on an upper left side, a first measurement region of the proximity sensor 102 on a lower left side, a first measurement region of the proximity sensor 103 on an upper right side, and a first measurement region of the proximity sensor 104 on a lower right side. The first distance is less than the second distance.

The first location region includes a first measurement region of a proximity sensor 1 on a first side, but does not include a first measurement region of a proximity sensor 1 on a second side. The second location region includes the first measurement region of the proximity sensor 1 on the second side, but does not include the first measurement region of the proximity sensor 1 on the first side. Herein, the first side is an opposite side of the second side.

For example, a location of the palm on the left is determined as the starting point when the palm is located in the first measurement regions of the upper-left proximity sensor 101 and the lower-left proximity sensor 102 on the left and is not located in the first measurement regions of the upper-right proximity sensor 103 and the lower-right proximity sensor 104 on the right.

A location of the palm on the right is determined as the ending point when the palm is located in the first measurement regions of the upper-right proximity sensor 103 and the lower-right proximity sensor 104 on the right and is not located in the first measurement regions of the upper-left proximity sensor 101 and the lower-left proximity sensor 102 on the left.

When the palm moves from the starting point to the ending point within 5 s, it is determined that a switching direction corresponding to the offset swipe action is from left to right, that is, the switching operation is left-to-right switching.

The first measurement region is an effective measurement region within which the proximity sensor 1 is capable of measuring a target object.

A second measurement region is a proximity measurement region within which the proximity sensor 1 is capable of measuring a target object.

For example, the proximity measurement region is denoted as H1, for example, H1 is 0-3 cm; and the effective measurement region is denoted as H2, for example, H2 is 3-15 cm. To be specific, the first distance is 3 cm, and the second distance is 15 cm.

In some embodiments, to ensure that the palm and the palm-based interaction device 5 remain parallel and level during measurement, a difference between distance measurement values measured by the upper-left proximity sensor 101 and the lower-left proximity sensor 102 on the left is less than a preset value when the palm is located in the first measurement regions of the upper-left proximity sensor 101 and the lower-left proximity sensor 102 on the left; or a difference between distance measurement values measured by the upper-right proximity sensor 103 and the lower-right proximity sensor 104 on the right is less than a preset value when the palm is located in the first measurement regions of the upper-right proximity sensor 103 and the lower-right proximity sensor 104 on the right.

For example, the palm-based interaction device determines an operation category of the forward/backward tap action based on an action parameter value of the forward/backward tap action in the sensor data; and performs the second response operation based on the operation category.

In some embodiments, the second response operation includes a press operation, for example, a tap operation or a double-tap operation, and may be used as at least one of the following operations: a selection operation, a confirmation operation, a back operation, a show (for example, show a page, show a list, or show details) operation. In response to that the palm enters first measurement regions of the at least two proximity sensors, the palm-based interaction device determines a time point at which the palm enters the first measurement regions as a first starting time point. It is determined that the operation category of the forward/backward tap action is the press operation in response to that distance measurement values measured by at least two first proximity sensors simultaneously decrease within a first time period and simultaneously increase or remain unchanged within a second time period, the first proximity sensor being included in the at least two proximity sensors, the first time period being a time period starting with the first starting time point, the second time period being a time period starting with an ending time point of the first time period, and the first time period being greater than the second time period, to be specific, duration of the first time period being greater than duration of the second time period.

In some embodiments, the second response operation may alternatively include a back operation, for example, back to a desktop or back to a previous page. In response to that the palm enters first measurement regions of the at least two proximity sensors, a time point at which the palm enters the first measurement regions is determined as a second starting time point. It is determined that the operation category of the forward/backward tap action is the back operation in response to that distance measurement values measured by at least two second proximity sensors simultaneously increase within a first time period, the second proximity sensor being included in the at least two proximity sensors, and the first time period being a time period starting with the second starting time point. In some embodiments, it is determined that the operation category of the forward/backward tap action is the back operation in response to that the distance measurement values measured by the at least two second proximity sensors simultaneously increase within the first time period and simultaneously decrease or remain unchanged within a second time period, the second time period being a time period starting with an ending time point of the first time period, and the first time period being greater than the second time period, to be specific, duration of the first time period being greater than duration of the second time period.

For example, the second response operation includes the selection operation. The palm-based interaction device 5 determines, based on the action parameter value of the forward/backward tap action, a category of the selection operation to which the forward/backward tap action belongs. The palm-based interaction device 5 performs the selection operation based on the category of the selection operation.

For example, the selection operation may include two categories: a confirmation operation and an exit operation for selection. For example, in a scenario of system settings for the palm-based interaction device 5, an operator may implement a confirmation operation or an exit operation for selection on a system interface through a forward/backward tap action. When the palm simultaneously enters first measurement regions of at least two proximity sensors 1, a time point at which the palm enters the first measurement regions is determined as a first starting time point T1. When distance measurement values measured by the proximity sensors 1 simultaneously decrease within a first time period T2 after the first starting time point T1 and distance measurement values measured by the proximity sensors 1 simultaneously increase or remain unchanged within a second time period T3 after the first time period T2, it is determined that a selection operation corresponding to the forward/backward tap action is a confirmation operation, the first time period being greater than the second time period, and T1, T2, and T3 being positive numbers.

For example, in a scenario of system settings for the palm-based interaction device 5, an operator may implement a selection operation or an exit operation on a system interface through a forward/backward tap action. When the palm simultaneously enters first measurement regions of at least two proximity sensors 1, a second starting time point t1 is determined. When distance measurement values measured by the at least two proximity sensors 1 simultaneously increase within a first time period t2 after the second starting time point t1, it is determined that a selection operation corresponding to the forward/backward tap action is an exit operation. In some embodiments, when the palm enters first measurement regions of proximity sensors 1, a second starting time point t1 is determined. When distance measurement values measured by the proximity sensors 1 simultaneously increase within a first time period t2 after the second starting time point t1 and distance measurement values measured by the proximity sensors 1 simultaneously decrease or remain unchanged within a second time period t3 after the first time period, it is determined that a selection operation corresponding to the forward/backward tap action is an exit operation, t1, t2, and t3 being positive numbers.

For example, the palm-based interaction device 5 obtains a palm image of the palm by using the camera 2; and the palm-based interaction device 5 determines, based on the palm image, an object identifier corresponding to the palm image, and enters an interaction mode when the object identifier is determined and dwell time of the palm in a second measurement region of the proximity sensor 1 is greater than a dwell time threshold.

For example, the palm-based interaction device 5 displays the first response operation for the offset swipe action on the display screen 3 in response to the offset swipe action, and the palm-based interaction device 5 displays the second response operation for the forward/backward tap action on the display screen 3 in response to the forward/backward tap action.

To sum up, in the method provided in this embodiment, the at least two proximity sensors are disposed in an array on the palm-based interaction device, the at least two proximity sensors capture the sensor data of the palm, the hovering interaction action of the palm may be recognized based on the sensor data, and the response operation for the hovering interaction action may be performed. In this way, a user can control the palm-based interaction device without touching or any physical contact. This provides a new manner of interaction between a user and a device, and can improve efficiency of interaction between a user and a device.

Figure 2:
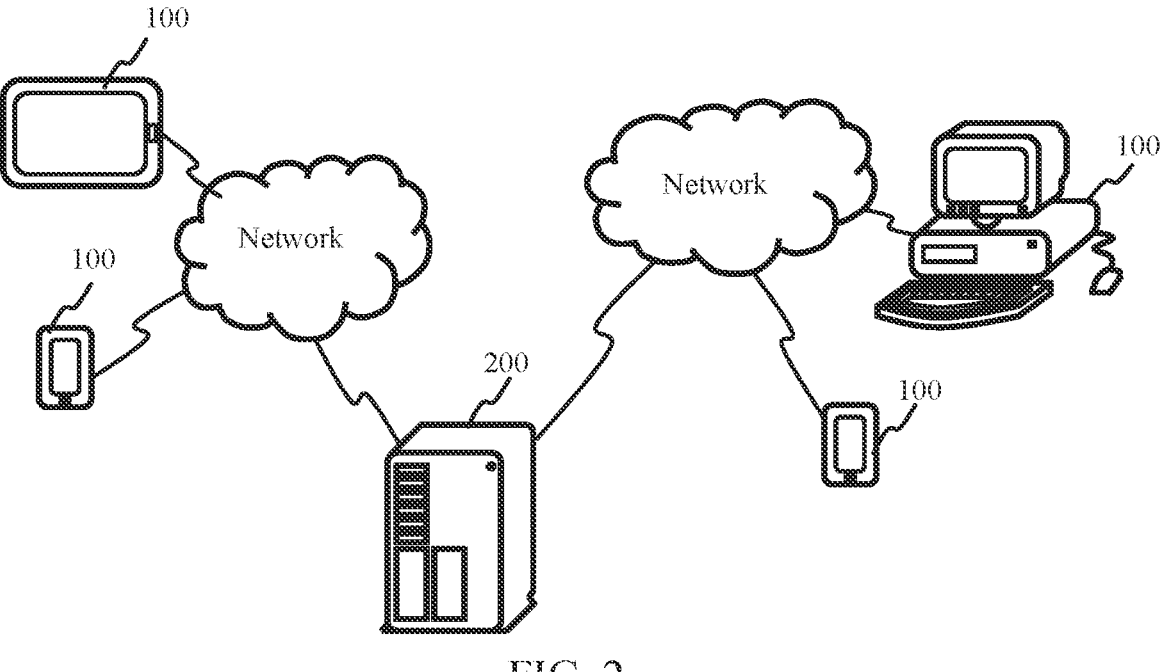
FIG. 2 is a schematic architectural diagram of a computer system according to an exemplary embodiment of this application.

FIG. 2 is a schematic architectural diagram of a computer system according to an embodiment of this application. The computer system may include a palm-based interaction device 100 and a server 200.

The palm-based interaction device 100 may be an electronic device such as a mobile phone, a tablet computer, a vehicle-mounted terminal (in-vehicle infotainment system), a wearable device, a personal computer (PC), a voice interaction device based on palm image recognition, a home appliance based on palm image recognition, an aircraft, or a self-service sales terminal. A client for a target application may be installed and run on the palm-based interaction device 100. The target application may be an application with reference to palm-based interaction, or may be another application providing a palm-based interaction function. This is not limited in this application. In addition, a form of the target application is not limited in this application. The target application includes but is not limited to an application (app) installed on the palm-based interaction device 100, a mini program, and the like, or may be in a form of a web page.

The server 200 may be an independent physical server, or may be a server cluster or a distributed system that includes a plurality of physical servers, or may be a cloud server that provides basic cloud computing services, for example, a cloud server that provides a cloud computing service, a cloud database, cloud computing, a cloud function, cloud storage, a network service, cloud communication, a middleware service, a domain name service, a security service, a content delivery network (CDN), big data, and an artificial palm image recognition platform. The server 200 may be a background server for the target application and is configured to provide a background service for the client of the target application.

In some embodiments, the server may alternatively be implemented as a node in a blockchain system. A blockchain is a new application model for computer technologies such as distributed data storage, peer-to-peer transmission, a consensus mechanism, and an encryption algorithm. The blockchain is essentially a decentralized database, and is a series of data blocks generated through association by using a cryptographic method. Each data block includes information of a batch of network transactions, to verify validity of the information (anti-counterfeiting) and generate a next block. The blockchain may include a blockchain underlying platform, a platform product service layer, and an application service layer.

The palm-based interaction device 100 and the server 200 may communicate with each other through a network, for example, a wired or wireless network.

In the palm-based human-computer interaction method provided in the embodiments of this application, steps may be performed by a palm-based interaction device. The palm-based interaction device is an electronic device with data computing, processing, and storage capabilities. The solution implementation environment shown in FIG. 2 is used as an example. The palm-based human-computer interaction method may be performed by the palm-based interaction device 100 (for example, the palm-based human-computer interaction method is performed by the client for the target application that is installed and run on the palm-based interaction device 100), or the palm-based human-computer interaction method may be performed by the server 200, or performed by the palm-based interaction device 100 and the server 200 through interaction and cooperation. This is not limited in this application.

Figures 3, 4:
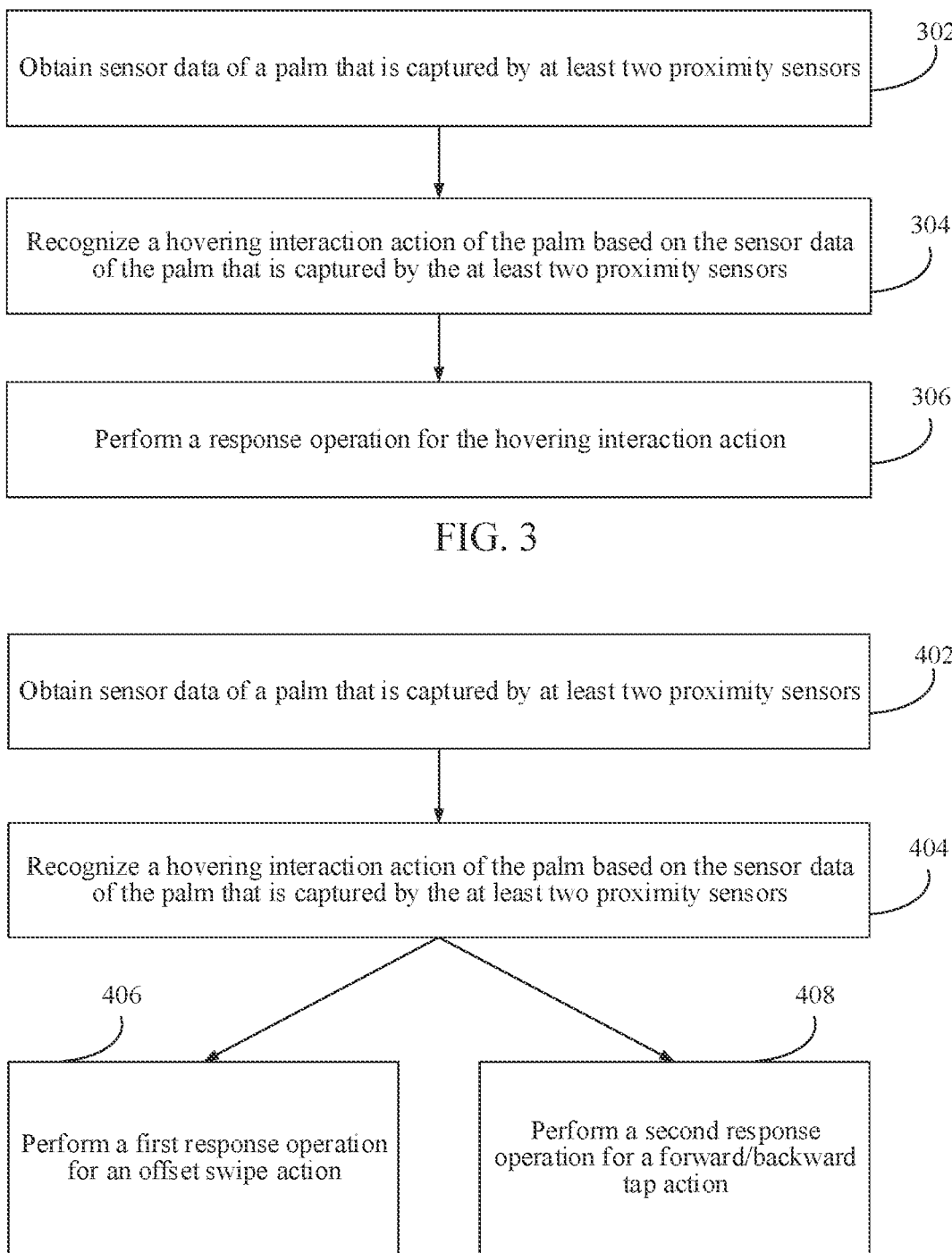
FIG. 3 is a flowchart of a palm-based human-computer interaction method according to an exemplary embodiment of this application.
FIG. 4 is a flowchart of a palm-based human-computer interaction method according to an exemplary embodiment of this application.

FIG. 3 is a flowchart of a palm-based human-computer interaction method according to an exemplary embodiment of this application. The method is applied to a palm-based interaction device with a proximity sensor. In other words, the method may be performed by the palm-based interaction device. The method includes the following steps:

Step 302: Obtain Sensor Data of a Palm That is Captured by at Least Two Proximity Sensors For example, the at least two proximity sensors are disposed in an array on the palm-based interaction device.

In some embodiments, in the case of two proximity sensors, the two proximity sensors are arranged at an upper left location and a lower right location, or the two proximity sensors are arranged at a lower left location and an upper right location, or the two proximity sensors are arranged at an upper location and a lower location, or the two proximity sensors are arranged at a left location and a right location.

In some embodiments, in the case of three proximity sensors, the three proximity sensors are arranged at locations in a triangular shape; or the three proximity sensors are arranged at an upper left location, a lower left location, and an upper right location; or the three proximity sensors are arranged at an upper left location, an upper right location, and a lower right location; or the three proximity sensors are arranged at an upper left location, a lower left location, and a lower right location; or the three proximity sensors are arranged at a lower left location, an upper right location, and a lower right location.

In some embodiments, in the case of four proximity sensors, the four proximity sensors are arranged in a rectangular shape at an upper left location, a lower left location, an upper right location, and a lower right location; or the four proximity sensors are arranged in a rhombic shape at an upper location, a lower location, a left location, and a right location. However, this does not constitute a limitation. This is not specifically limited in the embodiments of this application.

In some embodiments, in the case of two proximity sensors, the two proximity sensors are symmetrically disposed.

The proximity sensor is a non-contact sensor capable of sensing proximity of an object and/or measuring a distance of an object.

Step 304: Recognize a Hovering Interaction Action of the Palm Based on the Sensor Data of the Palm That is Captured by the at Least Two Proximity Sensors The hovering interaction action is an interaction action triggered in a hovering region above the palm-based interaction device. For example, when the palm-based interaction device detects that a distance between a location of the palm and a plane to which the at least two proximity sensors belong is less than an interaction distance threshold and dwell duration of the palm at the location is greater than a duration threshold, it is determined that the hovering interaction action is triggered. That is, the hovering interaction action implements a control operation on the palm-based interaction device without touching a screen or a button.

For example, the hovering interaction action includes at least one of an offset swipe action and a forward/backward tap action.

In some embodiments, the offset swipe action is a swipe action performed on a same plane. The offset swipe action includes at least one of a left-to-right swipe, a right-to-left swipe, a top-to-bottom swipe, a bottom-to-top swipe, and an oblique swipe (for example, a swipe in an upper left-to-lower right direction, and/or a swipe in a lower left-to-upper right direction, and/or a swipe in an upper right-to-lower left direction, and/or a swipe in a lower right-to-upper left direction), but is not limited thereto. This is not specifically limited in the embodiments of this application.

In some embodiments, the forward/backward tap action is a mid-air action of the palm moving close to or away from the palm-based interaction device.

For example, when the palm-based interaction device determines, based on the sensor data of the at least two proximity sensors, that the palm moves in a direction away from a proximity sensor on a first side and toward a proximity sensor on a second side, and a variation value of a distance between the palm and the plane to which the at least two proximity sensors belong is less than a variation threshold during movement, it is recognized that the hovering interaction action of the palm is the offset swipe action. The second side is an opposite side of the first side. For example, the first side is a left side, and the second side is a right side; or the first side is a right side, and the second side is a left side. For another example, the first side is an upper side, and the second side is a lower side; or the first side is a lower side, and the second side is an upper side. For another example, the first side is an upper left side, and the second side is a lower right side; or the first side is a lower right side, and the second side is an upper left side. For another example, the first side is a lower left side, and the second side is an upper right side; or the first side is an upper right side, and the second side is a lower left side.

For example, there are four proximity sensors, and the four proximity sensors are arranged in a rectangular shape at an upper left location, a lower left location, an upper right location, and a lower right location. When a first distance measurement value of an upper-left proximity sensor and/or a first distance measurement value of a lower-left proximity sensor gradually increase, it is determined that the palm moves in a direction away from the left side; when a second distance measurement value of an upper-right proximity sensor and/or a second distance measurement value of a lower-right proximity sensor gradually decrease, it is determined that the palm moves in a direction toward the right side; a variation value between a first distance measurement value at an initial moment of the action and a second distance measurement value at an ending moment is calculated; and when the palm moves in a direction away from the left side and toward the right side and the variation value is less than the variation threshold, it is determined that the hovering interaction action is a left-to-right offset swipe action.

When the first distance measurement value of the upper-left proximity sensor and/or the first distance measurement value of the lower-left proximity sensor gradually decrease, it is determined that the palm moves in a direction toward the left side; when the second distance measurement value of the upper-right proximity sensor and/or the second distance measurement value of the lower-right proximity sensor gradually increase, it is determined that the palm moves in a direction away from the right side; a variation value between a second distance measurement value at the initial moment of the action and a first distance measurement value at the ending moment is calculated; and when the palm moves in a direction toward the left side and away from the right side and the variation value is less than the variation threshold, it is determined that the hovering interaction action is a right-to-left offset swipe action.

When a third distance measurement value of the upper-left proximity sensor and/or a third distance measurement value of the upper-right proximity sensor gradually increase, it is determined that the palm moves in a direction away from the upper side; when a fourth distance measurement value of the lower-left proximity sensor and/or a fourth distance measurement value of the lower-right proximity sensor gradually decrease, it is determined that the palm moves in a direction toward the lower side; a variation value between a third distance measurement value at the initial moment of the action and a fourth distance measurement value at the ending moment is calculated; and when the palm moves in a direction away from the upper side and toward the lower side and the variation value is less than the variation threshold, it is determined that the hovering interaction action is a top-to-bottom offset swipe action.

When the third distance measurement value of the upper-left proximity sensor and/or the third distance measurement value of the upper-right proximity sensor gradually decrease, it is determined that the palm moves in a direction toward the upper side; when the fourth distance measurement value of the lower-left proximity sensor and/or the fourth distance measurement value of the lower-right proximity sensor gradually increase, it is determined that the palm moves in a direction away from the lower side; a variation value between a fourth distance measurement value at the initial moment of the action and a third distance measurement value at the ending moment is calculated; and when the palm moves in a direction toward the upper side and away from the lower side and the variation value is less than the variation threshold, it is determined that the hovering interaction action is a bottom-to-top offset swipe action.

When a fifth distance measurement value of the upper-left proximity sensor gradually increases, it is determined that the palm moves in a direction away from the upper left side; when a sixth distance measurement value of the lower-right proximity sensor gradually decreases, it is determined that the palm moves in a direction toward the lower right side; a variation value between a fifth distance measurement value at the initial moment of the action and a sixth distance measurement value at the ending moment is calculated; and when the palm moves in a direction away from the upper left side and toward the lower right side and the variation value is less than the variation threshold, it is determined that the hovering interaction action is an upper left-to-lower right offset swipe action.

When the fifth distance measurement value of the upper-left proximity sensor gradually decreases, it is determined that the palm moves in a direction toward the upper left side; when the sixth distance measurement value of the lower-right proximity sensor gradually increases, it is determined that the palm moves in a direction away from the lower right side; a variation value between a sixth distance measurement value at the initial moment of the action and a fifth distance measurement value at the ending moment is calculated; and when the palm moves in a direction toward the upper left side and away from the lower right side and the variation value is less than the variation threshold, it is determined that the hovering interaction action is a lower right-to-upper left offset swipe action.

When a seventh distance measurement value of the upper-right proximity sensor gradually increases, it is determined that the palm moves in a direction away from the upper right side; when an eighth distance measurement value of the lower-left proximity sensor gradually decreases, it is determined that the palm moves in a direction toward the lower left side; a variation value between a seventh distance measurement value at the initial moment of the action and an eighth distance measurement value at the ending moment is calculated; and when the palm moves in a direction away from the upper right side and toward the lower left side and the variation value is less than the variation threshold, it is determined that the hovering interaction action is an upper right-to-lower left offset swipe action.

When the seventh distance measurement value of the upper-right proximity sensor gradually decreases, it is determined that the palm moves in a direction toward the upper right side; when the eighth distance measurement value of the lower-left proximity sensor gradually increases, it is determined that the palm moves in a direction away from the lower left side; a variation value between an eighth distance measurement value at the initial moment of the action and a seventh distance measurement value at the ending moment is calculated; and when the palm moves in a direction toward the upper right side and away from the lower left side and the variation value is less than the variation threshold, it is determined that the hovering interaction action is a lower left-to-upper right offset swipe action.

For example, there are three proximity sensors, and the three proximity sensors are arranged at an upper left location, a lower left location, and an upper right location. When a first distance measurement value of an upper-left proximity sensor and/or a first distance measurement value of a lower-left proximity sensor gradually increase, it is determined that the palm moves in a direction away from the left side; when a second distance measurement value of an upper-right proximity sensor gradually decreases, it is determined that the palm moves in a direction toward the right side; a variation value between a first distance measurement value at an initial moment of the action and a second distance measurement value at an ending moment is calculated; and when the palm moves in a direction away from the left side and toward the right side and the variation value is less than the variation threshold, it is determined that the hovering interaction action is a left-to-right offset swipe action.

For example, there are two proximity sensors, and the two proximity sensors are arranged at an upper left location and a lower right location. When a first distance measurement value of an upper-left proximity sensor gradually increases, it is determined that the palm moves in a direction away from the left side; when a second distance measurement value of a lower-right proximity sensor gradually decreases, it is determined that the palm moves in a direction toward the right side; a variation value between a first distance measurement value at an initial moment of the action and a second distance measurement value at an ending moment is calculated; and when the palm moves in a direction away from the left side and toward the right side and the variation value is less than the variation threshold, it is determined that the hovering interaction action is a left-to-right offset swipe action.

For example, in response to that distance measurement values of the at least two proximity sensors gradually increase or decrease within a first time period and the distance measurement values are all less than an effective distance threshold, the palm-based interaction device determines that the hovering interaction action is the forward/backward tap action. For example, in response to that distance measurement values of at least two first proximity sensors simultaneously decrease within the first time period and simultaneously increase or remain unchanged within a second time period, it is determined that the forward/backward tap action is a press operation, the first proximity sensor being included in the at least two proximity sensors; or in response to that distance measurement values measured by at least two second proximity sensors simultaneously increase within the first time period and simultaneously decrease or remain unchanged within the second time period, it is determined that the forward/backward tap action is the back operation, the second proximity sensor being included in the at least two proximity sensors. The first time period is a time period starting with a first starting time point. The second time period is a time period starting with an ending time point of the first time period. The first time period is greater than the second time period.

Step 306: Perform a Response Operation for the Hovering Interaction Action

For example, after the proximity sensor in the palm-based interaction device recognizes the hovering interaction action of the palm, the palm-based interaction device performs the response operation for the hovering interaction action. The response operation for the hovering interaction action is an operation performed by the device in response to the hovering interaction action. In the palm-based interaction device, different hovering interaction actions correspond to different response operations. For example, when the hovering interaction action is the offset swipe action, the response operation may be a page switching operation, a page sliding operation, a slide-to-delete/select operation, or the like. For another example, when the hovering interaction action is the forward/backward tap action, the response operation may be a confirmation operation, a back operation, or the like. A correspondence between the palm-based interaction device and the response operation may be set by a system by default or defined by a user.

For example, during system settings for the palm-based interaction device, when the proximity sensor in the palm-based interaction device recognizes that the palm swipes from left to right, the palm-based interaction device performs a page flip operation based on the left-to-right swipe action, to be specific, switches to display an interface on the left.

To sum up, in the method provided in this embodiment, the at least two proximity sensors disposed in an array on the palm-based interaction device capture the sensor data, the hovering interaction action of the palm is recognized based on the sensor data, and the palm-based interaction device is controlled, based on the hovering interaction action, to perform the response operation corresponding to the hovering interaction action. This application provides a new interaction manner. A proximity sensor recognizes a hovering interaction operation performed by a palm, so that a user can control a palm-based interaction device without touching or any physical contact. This improves efficiency of interaction.

FIG. 4 is a flowchart of a palm-based human-computer interaction method according to an exemplary embodiment of this application. The method is applied to a palm-based interaction device with a proximity sensor, and the method may be performed by the palm-based interaction device. The method includes the following steps:

Step 402: Obtain Sensor Data of a Palm That is Captured by at Least Two Proximity Sensors For example, the at least two proximity sensors are disposed in an array on the palm-based interaction device.

Step 404: Recognize a Hovering Interaction Action of the Palm Based on the Sensor Data of the Palm That is Captured by the at Least Two Proximity Sensors The hovering interaction action is an interaction action triggered in a hovering region above the palm-based interaction device. That is, the hovering interaction action implements a control operation on the palm-based interaction device without touching a screen or a button.

For example, the palm-based interaction device displays a first response operation for an offset swipe action on a display screen, and the palm-based interaction device displays a second response operation for a forward/backward tap action on the display screen.

Figure 5:
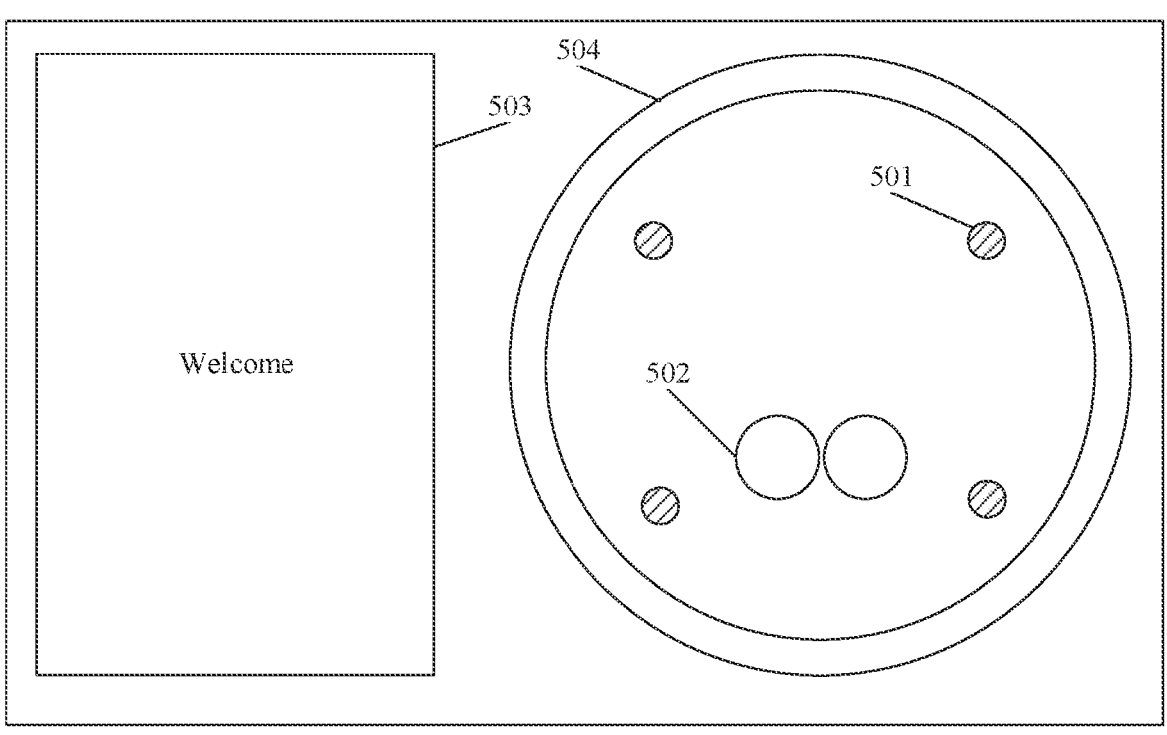
FIG. 5 is a schematic diagram of a palm-based interaction device according to an exemplary embodiment of this application.

FIG. 5 is a schematic diagram of a palm-based interaction device. The palm-based interaction device includes four proximity sensors 501, a camera 502, a display screen 503, and an aperture 504. The display screen 503 is disposed on a left side of the palm-based interaction device, but is not limited thereto. A location and a size of the display screen 503 are not specifically limited in the embodiments of this application.

The palm-based interaction device recognizes the hovering interaction action of the palm by using the proximity sensor 501, and performs a response operation corresponding to the hovering interaction action.

The aperture 504 is configured to assist in implementing the palm-based human-computer interaction method. For example, a range of interaction is determined based on a range of the aperture 504, and an operator performs the hovering interaction action within the range of the aperture 504 or a first range beyond the aperture 504 by using a circle center of the aperture 504 as a center, or a result of interaction between the palm and the palm-based interaction device is indicated by a color or brightness change of the aperture 504 during hovering interaction. For example, the aperture 504 blinks once after the interaction between the palm and the palm-based interaction device succeeds, or the aperture 504 continuously blinks after the interaction between the palm and the palm-based interaction device fails.

Step 406: Perform the First Response Operation for the Offset Swipe Action

The offset swipe action is a swipe action performed on a same plane.

The offset swipe action includes at least one of a left-to-right swipe, a right-to-left swipe, a top-to-bottom swipe, a bottom-to-top swipe, and an oblique swipe, but is not limited thereto. This is not specifically limited in the embodiments of this application.

For example, the palm-based interaction device performs the first response operation for the offset swipe action.

For example, the first response operation includes at least one of a switching operation, a page flip operation, a shift operation, and a display ratio adjustment operation, but is not limited thereto. This is not specifically limited in the embodiments of this application.

In some embodiments, the first response operation includes the switching operation, the palm-based interaction device determines a swipe direction corresponding to the offset swipe action based on an action parameter value of the offset swipe action, and the palm-based interaction device performs the switching operation based on the swipe direction.

In some embodiments, when the palm enters a first location region, a location of the palm in the first location region is determined as a starting point; when the palm enters a second location region, a location of the palm in the second location region is determined as an ending point; and when time taken by the palm to move from the starting point to the ending point is less than a first time threshold, a direction from the starting point to the ending point is determined as the swipe direction of the offset swipe action.

The first location region includes a first measurement region of a proximity sensor on a first side, but does not include a first measurement region of a proximity sensor on a second side. The second location region includes the first measurement region of the proximity sensor on the second side, but does not include the first measurement region of the proximity sensor on the first side.

The first measurement region is an effective measurement region within which the proximity sensor is capable of measuring a target object.

A second measurement region is a proximity measurement region within which the proximity sensor is capable of measuring a target object.

For example, the proximity measurement region is denoted as H1, for example, H1 is a region that is 0-3 cm away from the proximity sensor; and the effective measurement region is denoted as H2, for example, H2 is a region that is 3-15 cm away from the proximity sensor.

For example, a location of the palm on the left is determined as the starting point when the palm is located in a first measurement region of a proximity sensor on the left and is not located in a first measurement region of a proximity sensor on the right; or a location of the palm on the right is determined as the ending point when the palm is located in the first measurement region of the proximity sensor on the right and is not located in the first measurement region of the proximity sensor on the left. When the palm moves from the starting point to the ending point within 5 s, it is determined that a switching direction of the offset swipe action is from left to right, that is, the switching operation is left-to-right switching. The palm-based interaction device performs the switching operation of left-to-right switching based on the switching direction of the offset swipe action.

In some embodiments, to ensure that the palm and the palm-based interaction device remain parallel and level during measurement, a difference between distance measurement values measured by at least two proximity sensors on the first side is less than a preset value when the palm is located in first measurement regions of the proximity sensors on the first side; or a difference between distance measurement values measured by at least two proximity sensors on the second side is less than a preset value when the palm is located in first measurement regions of the proximity sensors on the second side.

Figure 6:
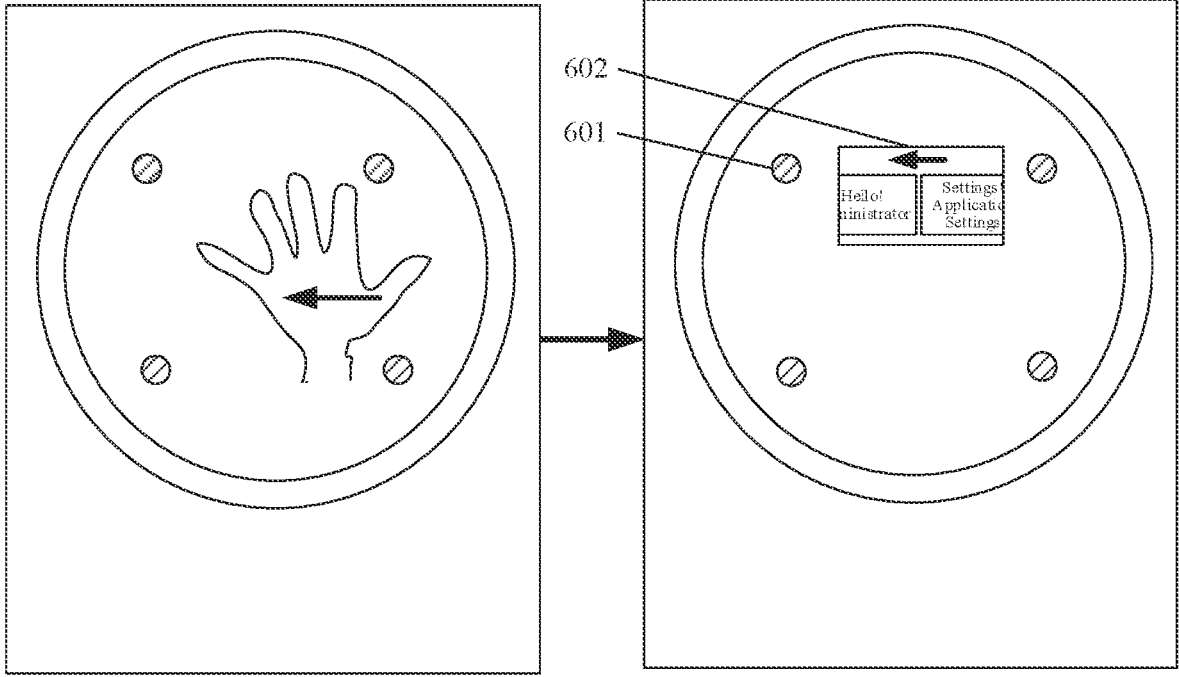
FIG. 6 is a schematic diagram of a switching operation corresponding to an offset swipe action according to an exemplary embodiment of this application.

For example, FIG. 6 is a schematic diagram of a switching operation corresponding to an offset swipe action. The palm-based interaction device is equipped with four proximity sensors 601 and a display screen 602. The four proximity sensors 601 are arranged in a rectangular shape at an upper left location, a lower left location, an upper right location, and a lower right location. In a scenario of system settings for the palm-based interaction device, a location of the palm at a current moment is determined as the starting point when the palm is located in first measurement regions of an upper-right proximity sensor 601 and a lower-right proximity sensor 601 and is not located in first measurement regions of an upper-left proximity sensor 601 and a lower-left proximity sensor 601; or a location of the palm at a current moment is determined as the ending point when the palm is located in the first measurement regions of the upper-left proximity sensor 601 and the lower-left proximity sensor 601 and is not located in the first measurement regions of the upper-right proximity sensor 601 and the lower-right proximity sensor 601. When the palm moves from the starting point to the ending point within 5 s, it is determined that a switching direction corresponding to the offset swipe action is from right to left, that is, the switching operation is right-to-left switching. The palm-based interaction device displays, on the display screen 602 based on the switching direction of the offset swipe action, right-to-left switching of a system interface, that is, switching from a "Hello! Administrator" interface to a "Settings! Application Settings" interface.

When the palm is located in the first measurement regions of the upper-left proximity sensor 601 and the lower-left proximity sensor 601 and is located in the first measurement regions of the upper-right proximity sensor 601 and the lower-right proximity sensor 601, data measured by the proximity sensors 601 is invalid data.

When time taken by the palm to move from a first location to a second location exceeds the first time threshold (5 s), data measured by the proximity sensors 601 at the first location and the second location of the palm is invalid data.

Figure 7:
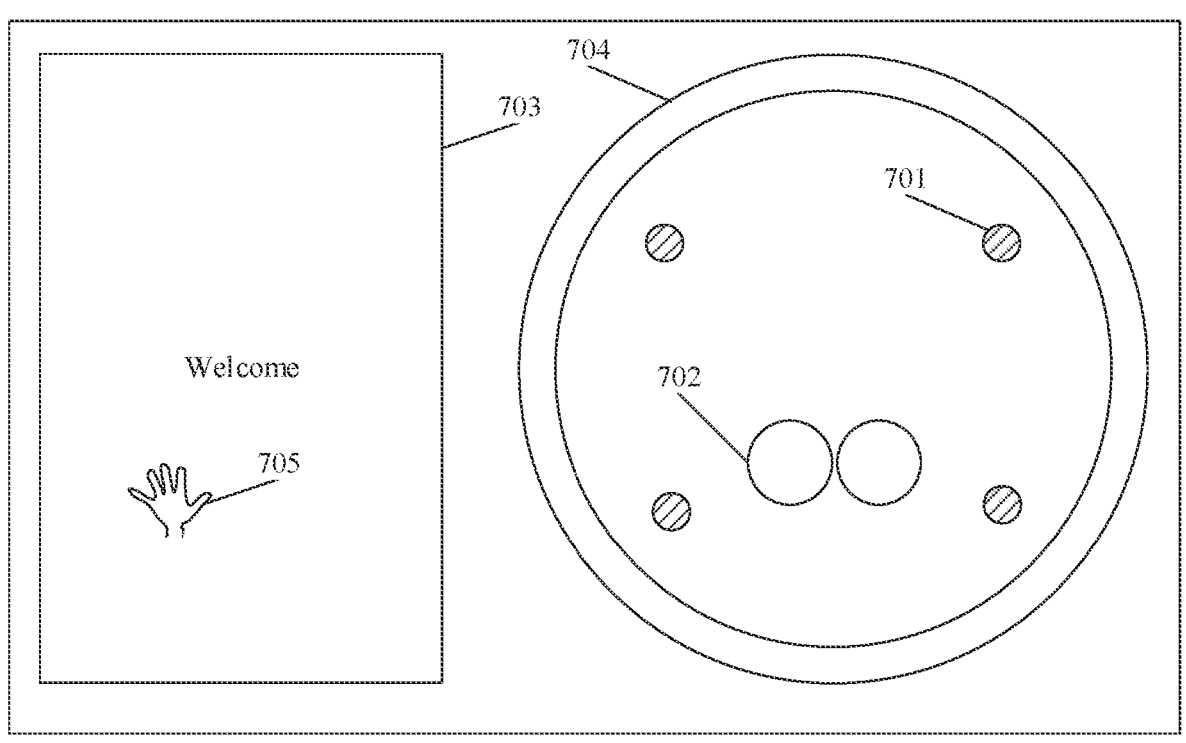
FIG. 7 is a schematic diagram of a shift operation corresponding to an offset swipe action according to an exemplary embodiment of this application.

In some embodiments, the first response operation includes the shift operation. For example, FIG. 7 is a schematic diagram of a shift operation corresponding to an offset swipe action. The palm-based interaction device includes four proximity sensors 701, a camera 702, a display screen 703, and an aperture 704. The display screen 703 is disposed on a left side of the palm-based interaction device, but is not limited thereto. A location and a size of the display screen 703 are not specifically limited in the embodiments of this application. After obtaining a palm image based on the camera 702 and determining an object identifier corresponding to the palm image, the palm-based interaction device displays a palm identifier 705 corresponding to a palm on the display screen 703. A moving track of the palm identifier 705 on the display screen 703 is used for representing an offset swipe action of the palm in a hovering region outside the palm-based interaction device.

For example, when the palm swipes from left to right in the hovering region outside the palm-based interaction device, the palm identifier 705 also moves from left to right on the display screen 703, so that a user can learn of a location of the palm relative to the palm-based interaction device in real time.

Figure 8:
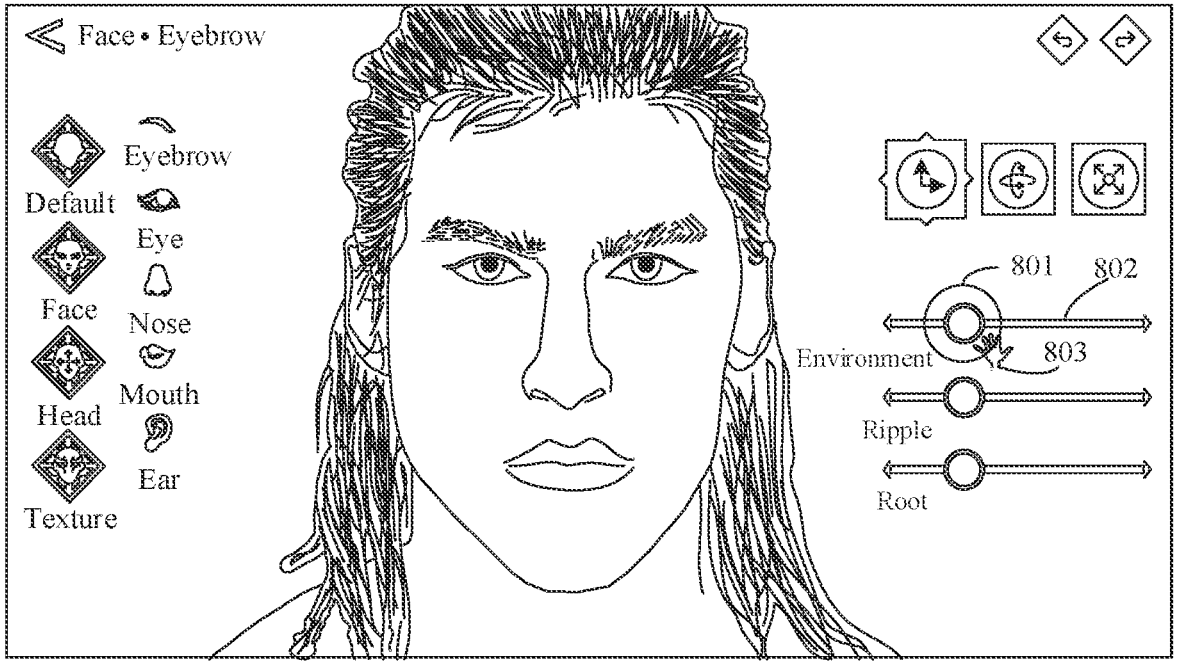
FIG. 8 is a schematic diagram of a display ratio adjustment operation corresponding to an offset swipe action according to an exemplary embodiment of this application.

In some embodiments, the first response operation includes the display ratio adjustment operation. For example, FIG. 8 is a schematic diagram of a display ratio adjustment operation corresponding to an offset swipe action. A display screen includes a sliding control, and the sliding control includes a sliding bar 802 and a slider 801. After obtaining a palm image based on a camera and determining an object identifier corresponding to the palm image, a palm-based interaction device displays a palm identifier 803 corresponding to a palm on the display screen. When a location of the palm relative to the palm-based interaction device changes, the palm identifier 803 on the display screen moves correspondingly. When the palm identifier 803 moves to a location of the slider 801, a display ratio of a local region in which the slider 801 is located increases from a first ratio to a second ratio, the second ratio being greater than the first ratio. The palm identifier 803 controls, through movement of the palm identifier 803, the slider 801 to move on the sliding bar 802, to implement a display ratio adjustment operation on an environmental parameter.

For example, when the palm identifier 803 moves to the location of the slider 801, the display ratio of the local region in which the slider 801 is located increases by 1.5 times. The palm identifier 803 controls, through movement of the palm identifier 803, the slider 801 to move on the sliding bar 802.

When the palm swipes from left to right in the hovering region outside the palm-based interaction device, the slider 801 on the sliding bar 802 corresponding to the environmental parameter is also adjusted from left to right.

Step 408: Perform the Second Response Operation for the Forward/Backward Tap Action For example, the second response operation includes at least one of a confirmation operation, an exit operation, a quantity increase operation, and a quantity decrease operation, but is not limited thereto. This is not specifically limited in the embodiments of this application.

For example, the second response operation includes a selection operation. The palm-based interaction device determines, based on an action parameter value of the forward/backward tap action, a category of a selection operation to which the forward/backward tap action belongs; and performs the selection operation based on the category of the selection operation.

In some embodiments, the selection operation includes at least one of the confirmation operation and the exit operation, but is not limited thereto.

For example, when the palm simultaneously enters first measurement regions of at least two proximity sensors, a time point at which the palm enters the first measurement regions is determined as a first starting time point. When distance measurement values measured by the at least two proximity sensors simultaneously decrease within a first time period after the first starting time point and distance measurement values measured by the at least two proximity sensors simultaneously increase or remain unchanged within a second time period after the first time period, it is determined that the selection operation corresponding to the forward/backward tap action is the confirmation operation, the first time period being greater than the second time period.

For example, in a scenario of system settings for the palm-based interaction device, an operator may implement a selection operation on a system interface through a forward/backward tap action. When the palm simultaneously enters first measurement regions of at least two proximity sensors, a first starting time point T1 is determined. When distance measurement values measured by the at least two proximity sensors simultaneously decrease within a first time period T2 after the first starting time point T1 and distance measurement values measured by the at least two proximity sensors simultaneously increase or remain unchanged within a second time period T3 after the first time period T2, it is determined that a selection operation corresponding to the forward/backward tap action is a confirmation operation.

Figure 9:
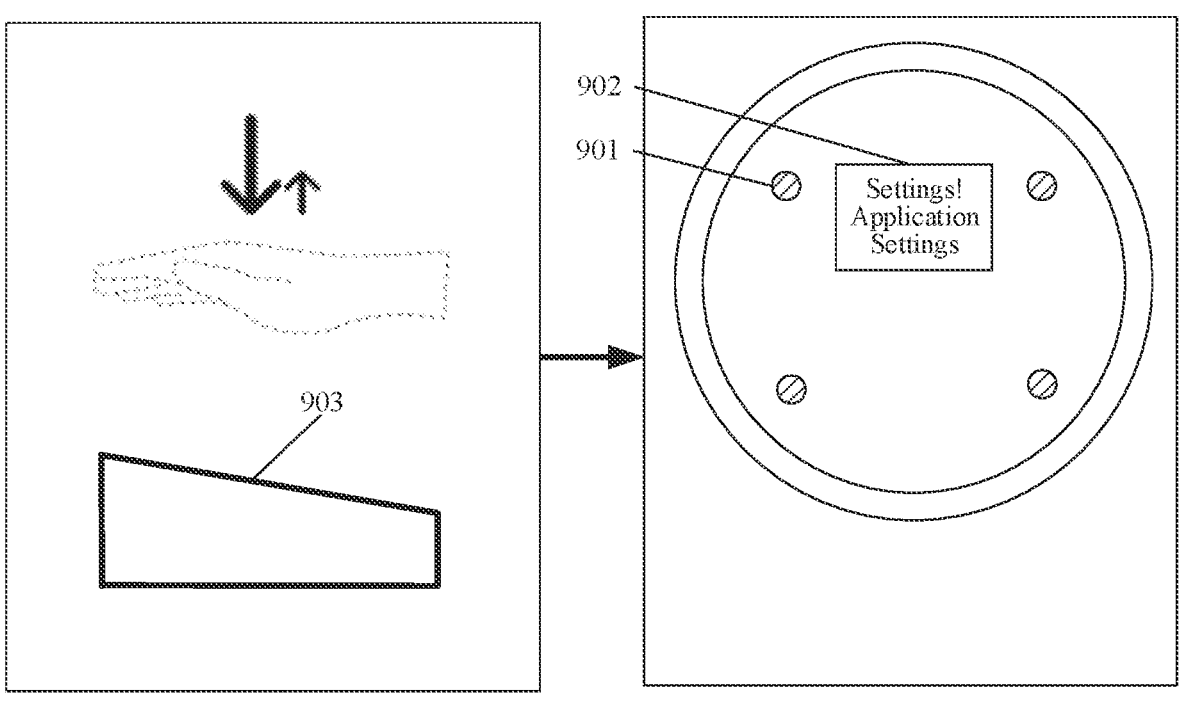
FIG. 9 is a schematic diagram of a confirmation operation corresponding to a forward/backward tap action according to an exemplary embodiment of this application.

For example, FIG. 9 is a schematic diagram of a confirmation operation corresponding to a forward/backward tap action. A palm-based interaction device 903 is equipped with four proximity sensors 901 and a display screen 902. The four proximity sensors 901 are arranged in a rectangular shape at an upper left location, a lower left location, an upper right location, and a lower right location. In a scenario of system settings for the palm-based interaction device 903, when a palm simultaneously enters first measurement regions of at least three proximity sensors 901, a first starting time point T1 is determined. When distance measurement values measured by the at least three proximity sensors 901 simultaneously decrease within a first time period T2 after the first starting time point T1 and distance measurement values measured by the at least three proximity sensors 901 simultaneously increase or remain unchanged within a second time period T3 after the first time period T2, that is, the palm moves in a direction toward the palm-based interaction device 903 within a time period of T1+T2, and the palm moves in a direction away from the palm-based interaction device 903 or remains motionless within a time period of (T1+T2) to (T1+T2+T3), the palm-based interaction device determines that a selection operation corresponding to the forward/backward tap action is a confirmation operation, which may also be referred to as a mid-air press operation.

For example, when the palm simultaneously enters first measurement regions of at least two proximity sensors, time at which the palm simultaneously enters the first measurement regions is determined as a second starting time point. When distance measurement values measured by the at least two proximity sensors simultaneously increase within a first time period after the second starting time point, it is determined that the selection operation corresponding to the forward/backward tap action is the exit operation.

In some embodiments, when the palm simultaneously enters first measurement regions of at least two proximity sensors, time at which the palm simultaneously enters the first measurement regions is determined as a second starting time point. When distance measurement values measured by the at least two proximity sensors simultaneously increase within a first time period after the second starting time point and distance measurement values measured by the at least two proximity sensors simultaneously decrease or remain unchanged within a second time period after the first time period, it is determined that the selection operation corresponding to the forward/backward tap action is the exit operation.

For example, in a scenario of system settings for the palm-based interaction device, an operator may implement an exit operation on a system interface through a forward/backward tap action. When the palm simultaneously enters first measurement regions of at least two proximity sensors, a second starting time point t1 is determined. When distance measurement values measured by the at least two proximity sensors simultaneously increase within a first time period t2 after the second starting time point t1, it is determined that a selection operation corresponding to the forward/backward tap action is an exit operation.

In some embodiments, when the palm simultaneously enters first measurement regions of at least two proximity sensors, a second starting time point t1 is determined. When distance measurement values measured by the at least two proximity sensors simultaneously increase within a first time period t2 after the second starting time point t1 and distance measurement values measured by the at least two proximity sensors simultaneously decrease or remain unchanged within a second time period t3 after the first time period, it is determined that the selection operation corresponding to the forward/backward tap action is the exit operation.

Figure 10:
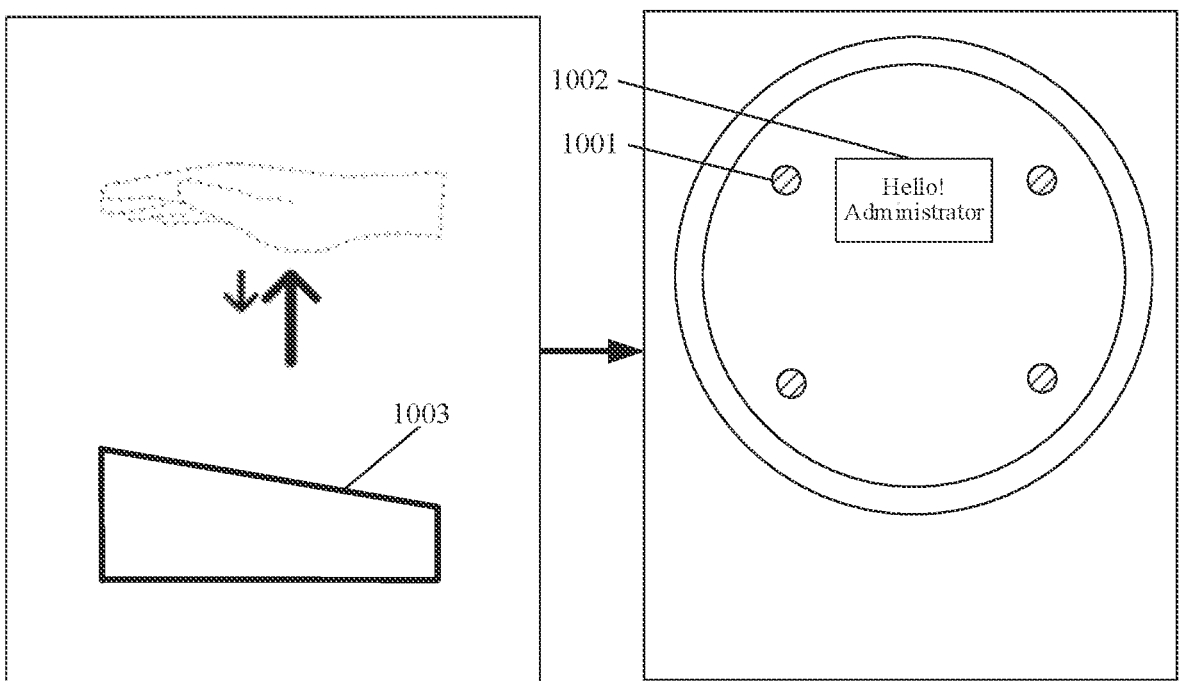
FIG. 10 is a schematic diagram of an exit operation corresponding to a forward/backward tap action according to an exemplary embodiment of this application.

For example, FIG. 10 is a schematic diagram of an exit operation corresponding to a forward/backward tap action. A palm-based interaction device is equipped with four proximity sensors 1001 and a display screen 1002. The four proximity sensors 1001 are arranged in a rectangular shape at an upper left location, a lower left location, an upper right location, and a lower right location. In a scenario of system settings for the palm-based interaction device 1003, when a palm is located in first half parts (parts close to the palm-based interaction device) of first measurement regions of at least three proximity sensors 1001, a second starting time point t1 is determined. When distance measurement values measured by the at least three proximity sensors 1001 simultaneously increase within a first time period t2 after the second starting time point t1, that is, the palm moves in a direction away from the palm-based interaction device 1003 within a time period of t1+t2, the palm-based interaction device determines that a selection operation corresponding to the forward/backward tap action is an exit operation, which may also be referred to as a mid-air back operation.

Further, when the palm is located in first half parts of first measurement regions of at least three proximity sensors 1001, a second starting time point t1 is determined. When distance measurement values measured by the at least three proximity sensors 1001 simultaneously increase within a first time period t2 after the second starting time point t1 and distance measurement values measured by the at least three proximity sensors 1001 simultaneously decrease or remain unchanged within a second time period t3 after the first time period t2, that is, the palm moves in a direction away from the palm-based interaction device 1003 within a time period of t1+t2, and the palm moves in a direction toward the palm-based interaction device or remains motionless within a time period of (t1+t2) to (t1+t2+t3), the palm-based interaction device determines that a selection operation corresponding to the forward/backward tap action is an exit operation, which may also be referred to as a mid-air back operation.

Figure 11:
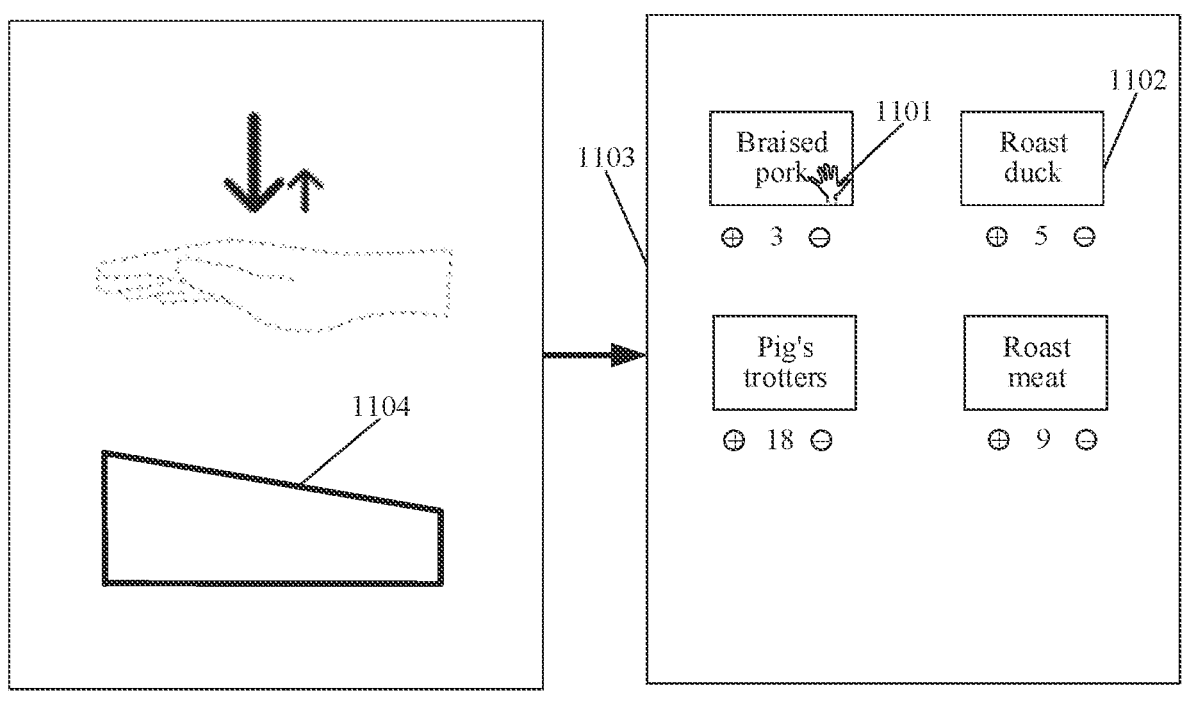
FIG. 11 is a schematic diagram of a quantity increase/decrease operation corresponding to a forward/backward tap action according to an exemplary embodiment of this application.

In some embodiments, the second response operation includes the quantity increase/decrease operation. For example, FIG. 11 is a schematic diagram of a quantity increase/decrease operation corresponding to a forward/backward tap action. In a selection and ordering scenario, a dish identifier 1102 is displayed on a display screen 1103. After obtaining a palm image based on a camera and determining an object identifier corresponding to the palm image, a palm-based interaction device 1104 displays a palm identifier 1101 corresponding to a palm on the display screen 1103. When a location of the palm relative to the palm-based interaction device 1104 changes, the palm identifier 1101 on the display screen moves correspondingly. When the palm identifier 1101 moves to a location of the dish identifier 1102 and dwells at the location of the dish identifier 1102 for 3 s, the dish identifier 1102 is selected, and the number of selected dish identifiers 1102 can be increased or decreased through a forward/backward tap action.

For example, when the palm simultaneously enters first measurement regions of at least two proximity sensors, a first starting time point T1 is determined. When distance measurement values measured by the at least two proximity sensors simultaneously decrease within a first time period T2 after the first starting time point T1 and distance measurement values measured by the at least two proximity sensors simultaneously increase or remain unchanged within a second time period T3 after the first time period T2, it is determined that a selection operation corresponding to the forward/backward tap action is a quantity increase operation.

When the palm simultaneously enters first measurement regions of at least two proximity sensors, a second starting time point t1 is determined. When distance measurement values measured by the at least two proximity sensors simultaneously increase within a first time period t2 after the second starting time point t1 and distance measurement values measured by the at least two proximity sensors simultaneously decrease or remain unchanged within a second time period t3 after the first time period, it is determined that a selection operation corresponding to the forward/backward tap action is a quantity decrease operation.

In an exemplary implementation, before the obtaining sensor data captured by at least two proximity sensors, the method further includes the following steps: The palm-based interaction device obtains a palm image of the palm by using a camera, determines an object identifier for the palm based on the palm image, and enters an interaction mode when the object identifier is determined and dwell time of the palm in the second measurement region of the proximity sensor is greater than a dwell time threshold.

Figure 12:
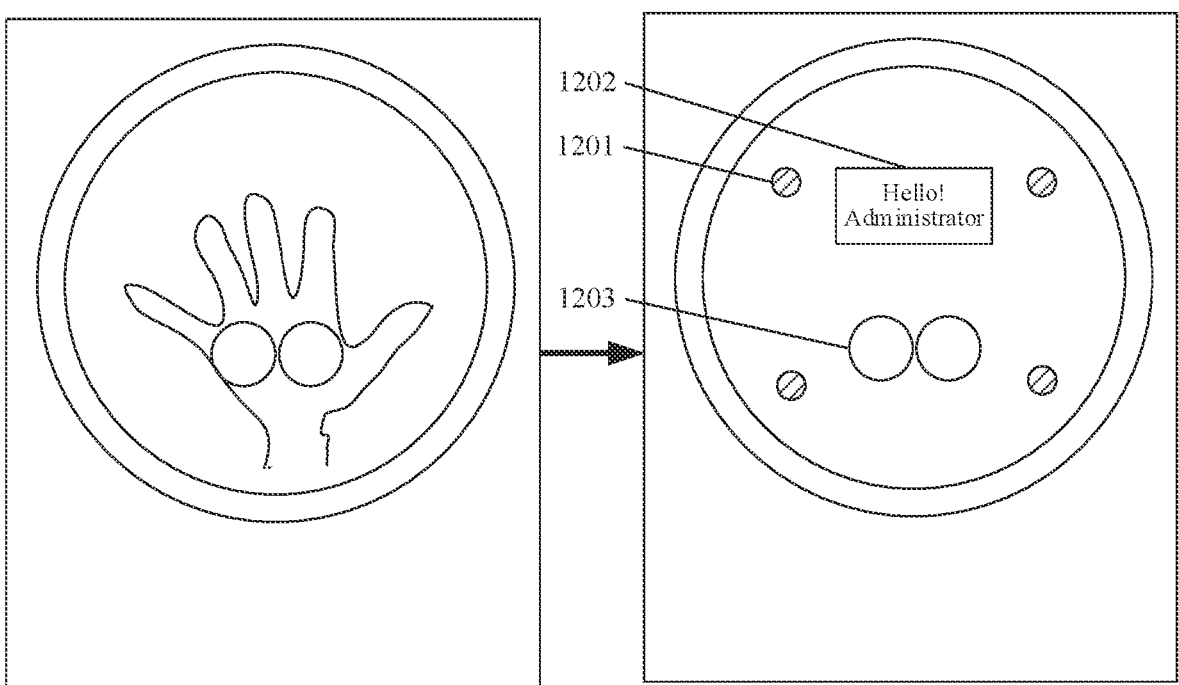
FIG. 12 is a schematic diagram of a palm-based interaction device in an interaction mode according to an exemplary embodiment of this application.

For example, FIG. 12 is a schematic diagram of a palm-based interaction device in an interaction mode. The palm-based interaction device is equipped with four proximity sensors 1201, a display screen 1202, and a camera 1203. The four proximity sensors 1201 are arranged in a rectangular shape at an upper left location, a lower left location, an upper right location, and a lower right location. The palm-based interaction device obtains a palm image of a palm by using the camera 1203. The palm-based interaction device determines an object identifier for the palm based on the palm image; and when the object identifier is determined and dwell time of the palm in a second measurement region of the proximity sensor 1201 is greater than a dwell time threshold, enters an interaction mode, and displays a settings interface on the display screen 1202.

For example, the dwell time threshold is set to 15 s. When the object identifier is determined by the palm-based interaction device by using the camera 1203 and dwell time of the palm in a region 3 cm away from the proximity sensor 1201 is greater than 15 s, the palm-based interaction device enters the interaction mode, and displays the settings interface on the display screen 1202.

The palm image is a palm image of a to-be-determined target object identifier. The palm image includes the palm. The palm is a palm of a target object whose identity is to be verified. The palm image may further include other information, for example, a finger of the target object or a scene in which the palm of the target object is photographed.

Figure 13:
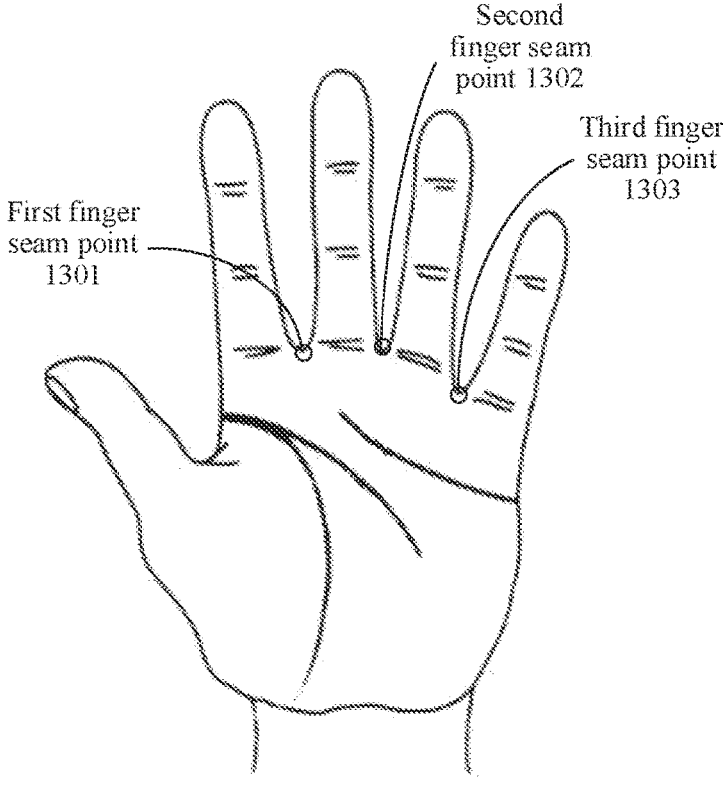
FIG. 13 is a schematic diagram of a finger seam point on a palm according to an exemplary embodiment of this application.

For example, FIG. 13 is a schematic diagram of a finger seam point on a palm. The finger seam point is a first finger seam point 1301 between an index finger and a middle finger, or the finger seam point is a second finger seam point 1302 between the middle finger and a ring finger, or the finger seam point is a third finger seam point 1303 between the ring finger and a little finger.

A palm region in the palm image may be located in any region of the palm image. Therefore, to determine a location of the palm region in the palm image, finger seam point detection is performed on the palm image to obtain at least one finger seam point of the palm image, so that the palm region can be subsequently determined based on the at least one finger seam point.

For example, the palm-based interaction device photographs the palm of the object to obtain the palm image. The palm image includes the palm. The palm may be a left palm of the object or a right palm of the object. For example, the palm-based interaction device is an Internet of Things device. The Internet of Things device photographs the left palm of the object by using the camera to obtain the palm image.

For example, the camera includes a color camera and an infrared camera. The palm-based interaction device obtains a color image of the palm by using the color camera, and obtains an infrared image of the same palm by using the infrared camera. The palm-based interaction device recognizes the palm based on the color image and the infrared image to determine an object identifier corresponding to the palm image, that is, determine the object identifier for the palm.

The color image is an image obtained by the color camera by imaging the palm based on natural light.

The infrared image is an image obtained by the infrared camera by imaging the palm based on infrared light.

In some embodiments, the palm-based interaction device alternatively performs comparison and recognition on the palm based on the color image and the infrared image to determine the object identifier for the palm. The comparison and recognition on the palm means performing comparison and recognition on a feature in the palm region and a preset palm feature in a database.

The preset palm feature is a stored palm feature of a palm corresponding to an object identifier. Each preset palm feature has a corresponding object identifier, which indicates that the preset palm feature belongs to the object identifier and is a palm feature of a palm of the object. The object identifier may be any object identifier. For example, the object identifier is an object identifier registered with a payment application, or the object identifier is an object identifier registered with an enterprise.

In the embodiments of this application, the palm-based interaction device includes a database, and the database includes a plurality of preset palm features and an object identifier corresponding to each preset palm feature. In the database, one object identifier may correspond to one preset palm feature, or one object identifier may correspond to at least two preset palm features.

For example, a plurality of objects are registered with a palm-based interaction device, a preset palm feature of each object is bound to a corresponding object identifier, and palm features of the plurality of objects are stored in the database with corresponding object identifiers. When an object subsequently uses the palm-based interaction device, palm comparison and recognition are performed on an infrared image, a color image, and a preset palm feature in the database to determine an object identifier and verify an identify of the object.

To sum up, in the method provided in this embodiment, the at least two proximity sensors disposed in an array on the palm-based interaction device capture the sensor data, the offset swipe action and the forward/backward tap action of the palm are recognized based on the sensor data, and the palm-based interaction device is controlled, based on the offset swipe action and the forward/backward tap action, to perform the switching operation, the confirmation operation, or the exit operation. This application provides a new interaction manner. A proximity sensor recognizes a hovering interaction operation performed by a palm, so that a user can control a palm-based interaction device without touching or any physical contact. This improves efficiency of interaction.

As a biometric feature, a palm has biological uniqueness and differentiation. Compared with facial recognition widely used in the fields of identity verification, payment, access control, bus riding, and the like, a palm is not affected by makeup, masks, sunglasses, or the like. This can improve accuracy of identity verification for an object. In some scenarios, for example, in an epidemic prevention and control scenario, a mask needs to be put on to cover the mouth and the nose. In this case, using a palm image for identity verification may be a better choice.

Figure 14:
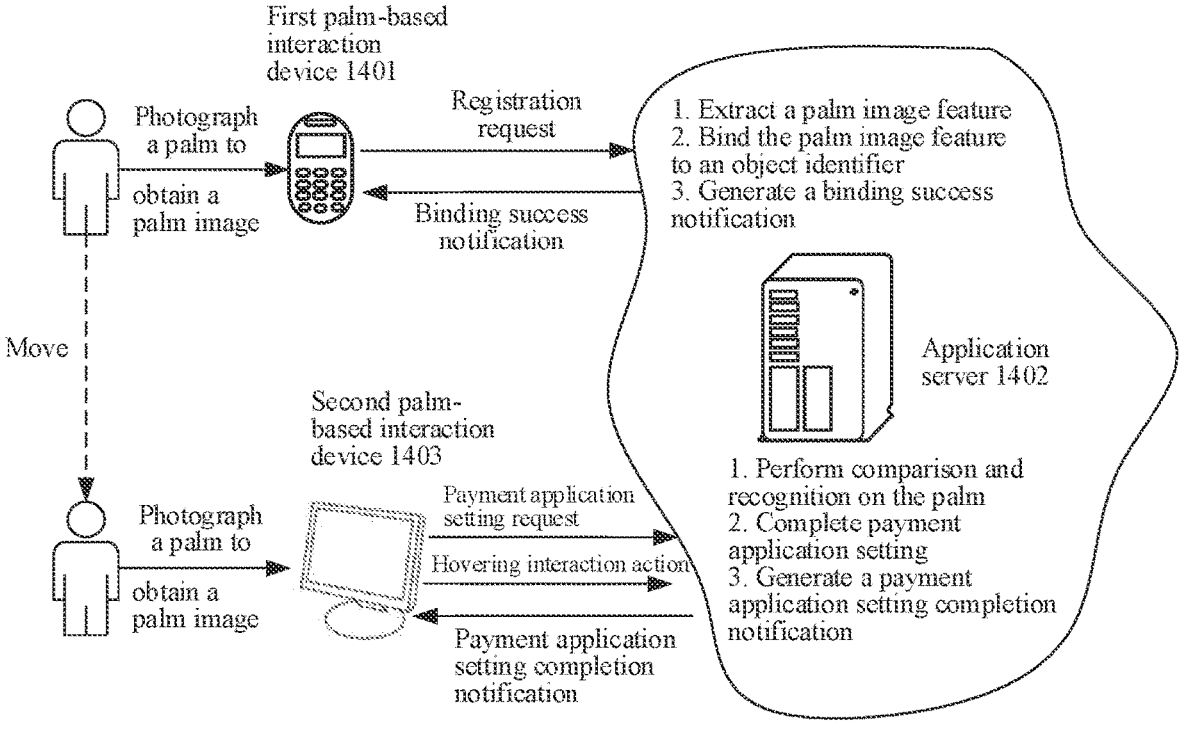
FIG. 14 is a schematic diagram of cross-device hovering interaction based on a palm-based human-computer interaction method according to an exemplary embodiment of this application.

FIG. 14 is a schematic diagram of cross-device hovering interaction based on a palm-based human-computer interaction method according to an exemplary embodiment of this application. The method relates to a first palm-based interaction device 1401, a second palm-based interaction device 1403, and an application server 1402.

An application, for example, a payment application, is installed on the first palm-based interaction device 1401. The first palm-based interaction device 1401 logs in to the payment application based on an object identifier, and establishes a communication connection to the application server 1402. The first palm-based interaction device 1401 may interact with the application server 1402 through the communication connection. An object may control the first palm-based interaction device 1401 through a hovering interaction action, for example, to set the payment application. A payment application is also installed on the second palm-based interaction device 1403. The second palm-based interaction device 1403 logs in to the payment application based on a merchant identifier, and establishes a communication connection to the application server 1402. The second palm-based interaction device 1403 may interact with the application server 1402 through the communication connection. An object may control the second palm-based interaction device 1403 through a hovering interaction action, for example, to set the payment application.

The cross-device hovering interaction process includes the following steps:

1. An object holds the first palm-based interaction device 1401 at home, photographs a palm of the object by using the first palm-based interaction device 1401 to obtain a palm image of the object, logs in to the payment application based on an object identifier, and transmits a palm image registration request to the application server 1402, the palm image registration request carrying the object identifier and the palm image.

2. The application server 1402 receives the palm image registration request transmitted by the first palm-based interaction device 1401, processes the palm image to obtain a palm feature of the palm image, stores the palm feature in correspondence with the object identifier, and transmits a palm image binding success notification to the first palm-based interaction device 1401.

The application server 1402 uses the palm feature as a preset palm feature after storing the palm feature in correspondence with the object identifier. Subsequently, the corresponding object identifier may be determined based on the stored preset palm feature.

3. The first palm-based interaction device 1401 receives the palm image binding success notification and displays the palm image binding success notification to notify the object that the palm image is bound to the object identifier.

The object registers the palm image through interaction between the first palm-based interaction device 1401 and the application server 1402, and subsequently, may quickly implement recognition by using a palm image, to control the first palm-based interaction device 1401 to enter a human-computer interaction mode and control the first palm-based interaction device 1401 through a hovering interaction action.

4. When the object performs human-computer interaction with the second palm-based interaction device 1403 in another place, the second palm-based interaction device 1403 photographs a palm of the object to obtain a palm image, and transmits a payment application setting request to the application server 1402 based on the payment application logged in to on the second palm-based interaction device 1403, the payment application setting request carrying an identifier of the second palm-based interaction device 1403, a hovering interaction action, and the palm image.

5. After receiving the payment application setting request, the application server 1402 performs palm comparison and recognition on the palm image to determine an object identifier for the palm image, performs payment application setting based on the hovering interaction action, and transmits a payment application setting completion notification to the second palm-based interaction device 1403 after the payment application setting is completed.

After registering the palm image by using the first palm-based interaction device 1401, the object may directly set the payment application on the second palm-based interaction device 1403, without registering a palm image on the second palm-based interaction device 1403. This implements cross-device palm-based human-computer interaction and improves convenience.

6. After receiving the payment application setting completion notification, the second palm-based interaction device 1403 displays the payment application setting completion notification to notify the object that the payment application setting is completed, so that the object knows that the setting on the second palm-based interaction device 1403 is completed.

For example, the palm-based human-computer interaction function provided in the embodiments of this application is only one function of the palm-based interaction device, and application scenarios of the palm-based interaction device include but are not limited to the following scenarios:

For example, in a payment scenario based on palm image recognition, a palm-based interaction device of a merchant photographs a palm of an object to obtain a palm image of the object, determines a target object identifier for the palm image by using the palm-based human-computer interaction method provided in the embodiments of this application, and transfers some resources in a resource account corresponding to the target object identifier to a resource account of the merchant to implement palm-based automatic payment.

For another example, in a cross-device payment scenario, an object may use a personal mobile phone at home or in other private space to complete identity registration to bind an account of the object to a palm image of the object; and then may recognize the palm image of the object on a device in a store to determine an account of the object, and directly pay by using the account.

For still another example, in a clock-in scenario, a palm-based interaction device photographs a palm of an object to obtain a palm image of the object, determines a target object identifier for the palm image by using the palm-based human-computer interaction method provided in the embodiments of this application, establishes a clock-in mark for the target object identifier, and determines that clock-in is completed for the target object identifier at current time.

Certainly, in addition to the foregoing scenarios, the method provided in the embodiments of this application may be further applied to other scenarios in which palm-based human-computer interaction is required. Specific application scenarios are not limited in the embodiments of this application.

Figure 15:
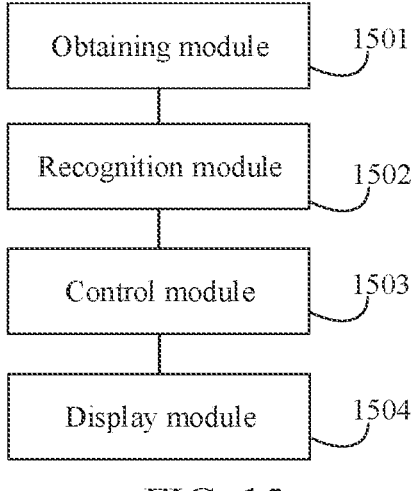
FIG. 15 is a block diagram of a palm-based interaction apparatus according to an exemplary embodiment of this application.

FIG. 15 is a schematic structural diagram of a palm-based interaction apparatus according to an exemplary embodiment of this application. The apparatus may be implemented as all or a part of a palm-based interaction device by using software, hardware, or a combination of software and hardware. The apparatus includes:

an obtaining module 1501, configured to obtain sensor data of a palm that is captured by at least two proximity sensors, the at least two proximity sensors being disposed in an array on a palm-based interaction device;

a recognition module 1502, configured to recognize a hovering interaction action of the palm based on the sensor data of the palm that is captured by the at least two proximity sensors; and a control module 1503, configured to perform a response operation for the hovering interaction action.

In an exemplary implementation, the hovering interaction action includes at least one of an offset swipe action and a forward/backward tap action;

the control module 1503 is further configured to perform a first response operation for the offset swipe action; and the control module 1503 is further configured to perform a second response operation for the forward/backward tap action.

In an exemplary implementation, the control module 1503 is further configured to: determine a swipe direction of the offset swipe action based on an action parameter value of the offset swipe action in the sensor data; and control, based on the swipe direction, the palm-based interaction device to perform the first response operation.

In an exemplary implementation, the control module 1503 is further configured to: in response to that the palm enters a first location region, determine a location of the palm in the first location region as a starting point; in response to that the palm moves from the first location region to a second location region, determine a location of the palm in the second location region as an ending point; and when time taken by the palm to move from the starting point to the ending point is less than a first time threshold, determine a direction from the starting point to the ending point as the swipe direction.

In an exemplary implementation, the control module 1503 is further configured to: determine an operation category of the forward/backward tap action based on an action parameter value of the forward/backward tap action in the sensor data; and control, based on the operation category, the palm-based interaction device to perform the second response operation.

In an exemplary implementation, the control module 1503 is further configured to: in response to that the palm enters first measurement regions of the at least two proximity sensors, determine a time point at which the palm enters the first measurement regions as a first starting time point; and determine that the operation category of the forward/backward tap action is a press operation in response to that distance measurement values measured by at least two first proximity sensors simultaneously decrease within a first time period and simultaneously increase or remain unchanged within a second time period, the first proximity sensor being included in the at least two proximity sensors, the first time period being a time period starting with the first starting time point, the second time period being a time period starting with an ending time point of the first time period, and the first time period being greater than the second time period.

In an exemplary implementation, the control module 1503 is further configured to: in response to that the palm enters first measurement regions of the at least two proximity sensors, determine a time point at which the palm enters the first measurement regions as a second starting time point; and determine that the operation category of the forward/backward tap action is a back operation in response to that distance measurement values measured by at least two second proximity sensors simultaneously increase within a first time period, the second proximity sensor being included in the at least two proximity sensors, and the first time period being a time period starting with the second starting time point.

In an exemplary implementation, the control module 1503 is further configured to determine that the operation category of the forward/backward tap action is the back operation in response to that the distance measurement values measured by the at least two second proximity sensors simultaneously increase within the first time period and simultaneously decrease or remain unchanged within a second time period, the second time period being a time period starting with an ending time point of the first time period, and the first time period being greater than the second time period.

In an exemplary implementation, the obtaining module 1501 is further configured to obtain a palm image of the palm by using a camera;

the recognition module 1502 is further configured to determine an object identifier for the palm based on the palm image; and the control module 1503 is further configured to enter an interaction mode when the object identifier is determined and dwell time of the palm in the second measurement region of the proximity sensor is greater than a dwell time threshold.

In an exemplary implementation, the obtaining module 1501 is further configured to obtain a color image of the palm by using a color camera, the color image being an image obtained by the color camera by imaging the palm based on natural light;

the obtaining module 1501 is further configured to obtain an infrared image of the same palm by using an infrared camera, the infrared image being an image obtained by the infrared camera by imaging the palm based on infrared light; and the recognition module 1502 is further configured to recognize the palm based on the color image and the infrared image to determine the object identifier for the palm.

In an exemplary implementation, the display module 1504 is configured to display the first response operation for the offset swipe action on a display screen; and the display module 1504 is configured to display the second response operation for the forward/backward tap action on the display screen.

Figure 16:
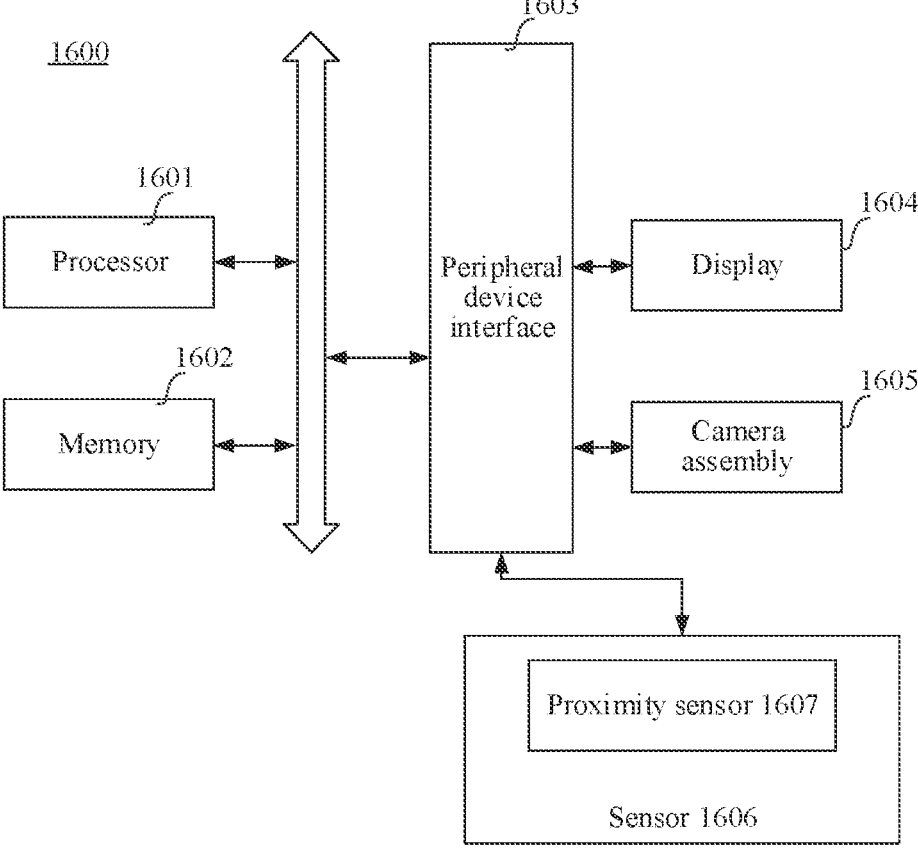
FIG. 16 is a schematic structural diagram of a palm-based interaction device according to an exemplary embodiment of this application.

FIG. 16 is a structural block diagram of a palm-based interaction device 1600 according to an exemplary embodiment of this application. The palm-based interaction device 1600 may be a smartphone, a tablet computer, a desktop computer, smartwatch, a robot, a Moving Picture Experts Group Audio Layer III (MP3) player, a Moving Picture Experts Group Audio Layer IV (MP4) player, or the like.

The palm-based interaction device 1600 includes a processor 1601 and a memory 1602.

The processor 1601 may include one or more processing cores, for example, a 4-core processor or an 8-core processor. The processor 1601 maybe implemented in at least one hardware form of a digital signal processor (DSP), a field-programmable gate array (FPGA), and a programmable logic array (PLA). The processor 1601 may also include a main processor and a coprocessor. The main processor is a processor configured to process data in an awake state, and is also referred to as a central processing unit (CPU). The coprocessor is a low-power processor configured to process data in a standby state. In some embodiments, the processor 1601 maybe integrated with a graphics processing unit (GPU). The GPU is configured to render and draw content that needs to be displayed on a display screen. In some embodiments, the processor 1601 may further include an artificial intelligence (AI) processor. The AI processor is configured to process computing operations related to machine learning.

The memory 1602 may include one or more computer-readable storage media. The computer-readable storage medium may be tangible and non-transient. The memory 1602 may further include a high-speed random access memory and a nonvolatile memory, for example, one or more disk storage devices or flash storage devices. In some embodiments, the non-transient computer-readable storage medium in the memory 1602 is configured to store at least one instruction, and the at least one instruction is executed by the processor 1601 to implement the palm-based human-computer interaction method provided in this application.

In some embodiments, the palm-based interaction device 1600 further includes a peripheral device interface 1603 and at least one peripheral device. Specifically, the peripheral device includes at least one of a display screen 1604 and a camera assembly 1605.

The peripheral interface 1603 maybe configured to connect the at least one peripheral related to input/output (I/O) to the processor 1601 and the memory 1602. In some embodiments, the processor 1601, the memory 1602, and the peripheral device interface 1603 are integrated on one chip or circuit board. In some other embodiments, any one or two of the processor 1601, the memory 1602, and the peripheral device interface 1603 may be implemented on a separate chip or circuit board. This is not limited in this embodiment.

The display screen 1604 is configured to display a user interface (UI). The UI may include a graph, text, an icon, a video, and any combination thereof. In some embodiments, the display screen 1604 maybe a touch display screen, and the touch display screen further has a capability of capturing a touch signal on or above a surface of the touch display screen. The touch signal may be input to the processor 1601 as a control signal for processing. The touch display screen is configured to provide a virtual button and/or a virtual keyboard, also referred to as a soft button and/or a soft keyboard. In some embodiments, there may be one display screen 1604, which is disposed on a front panel of the palm-based interaction device 1600. In some other embodiments, there may be at least two display screens 1604, which are respectively disposed on different surfaces of the palm-based interaction device 1600 or designed in a folded manner. In some other embodiments, the display screen 1604 maybe a flexible display screen disposed on a curved surface or a folded surface of the palm-based interaction device 1600. Even, the display screen 1604 may alternatively be disposed in a non-rectangular irregular pattern, namely, a special-shaped screen. The display screen 1604 maybe made of a liquid crystal display (LCD), an organic light-emitting diode (OLED), or other materials.

The camera assembly 1605 is configured to capture an image or a video. In some embodiments, the camera assembly 1605 includes a front-facing camera and a rear-facing camera. Usually, the front-facing camera is configured to implement video calls or selfies, and the rear-facing camera is configured to capture photos or videos. In some embodiments, there are at least two rear-facing cameras, each of which is any one of a main camera, a depth-of-field camera, and a wide-angle camera, to implement a background blur function through fusion of the main camera and the depth-of-field camera, and implement a panoramic photographing function and a virtual reality (VR) photographing function through fusion of the main camera and the wide-angle camera. In some embodiments, the camera assembly 1605 may further include a flash. The flash may be a monochrome temperature flash or a double color temperature flash. The double color temperature flash is a combination of a warm light flash and a cold light flash, and may be used for light compensation under different color temperatures. In some other embodiments, the camera may include a color camera and an infrared camera.

In some embodiments, the palm-based interaction device 1600 further includes one or more sensors 1606. The one or more sensors 1606 include but are not limited to a proximity sensor 1607.

Figure 17:
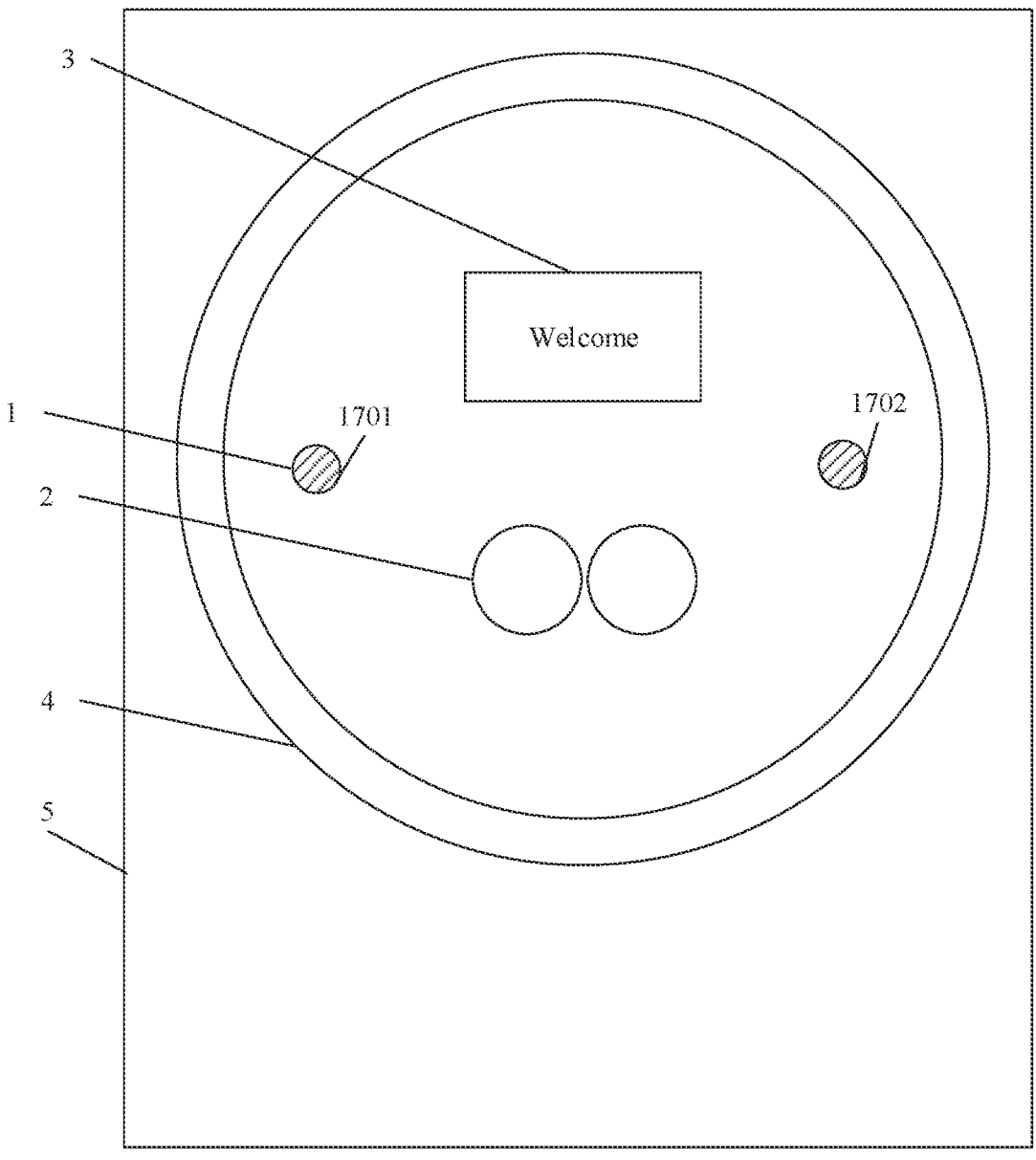
FIG. 17 is a schematic diagram of arrangement of proximity sensors according to an exemplary embodiment of this application.

The proximity sensor 1607, also referred to as a distance sensor, is usually disposed in the front of the palm-based interaction device 1600. The proximity sensor 1607 is configured to capture a distance between a user and the front of the palm-based interaction device 1600. In an embodiment, at least two proximity sensors 1607 are disposed in an array on the palm-based interaction device 1600. For example, in the case of two proximity sensors, the two proximity sensors are arranged at an upper left location and a lower right location, or the two proximity sensors are arranged at a lower left location and an upper right location, or the two proximity sensors are arranged at an upper location and a lower location, or the two proximity sensors are arranged at a left location and a right location. For example, as shown in FIG. 17, the two proximity sensors are a left proximity sensor 1701 and a right proximity sensor 1702.

Figure 18:
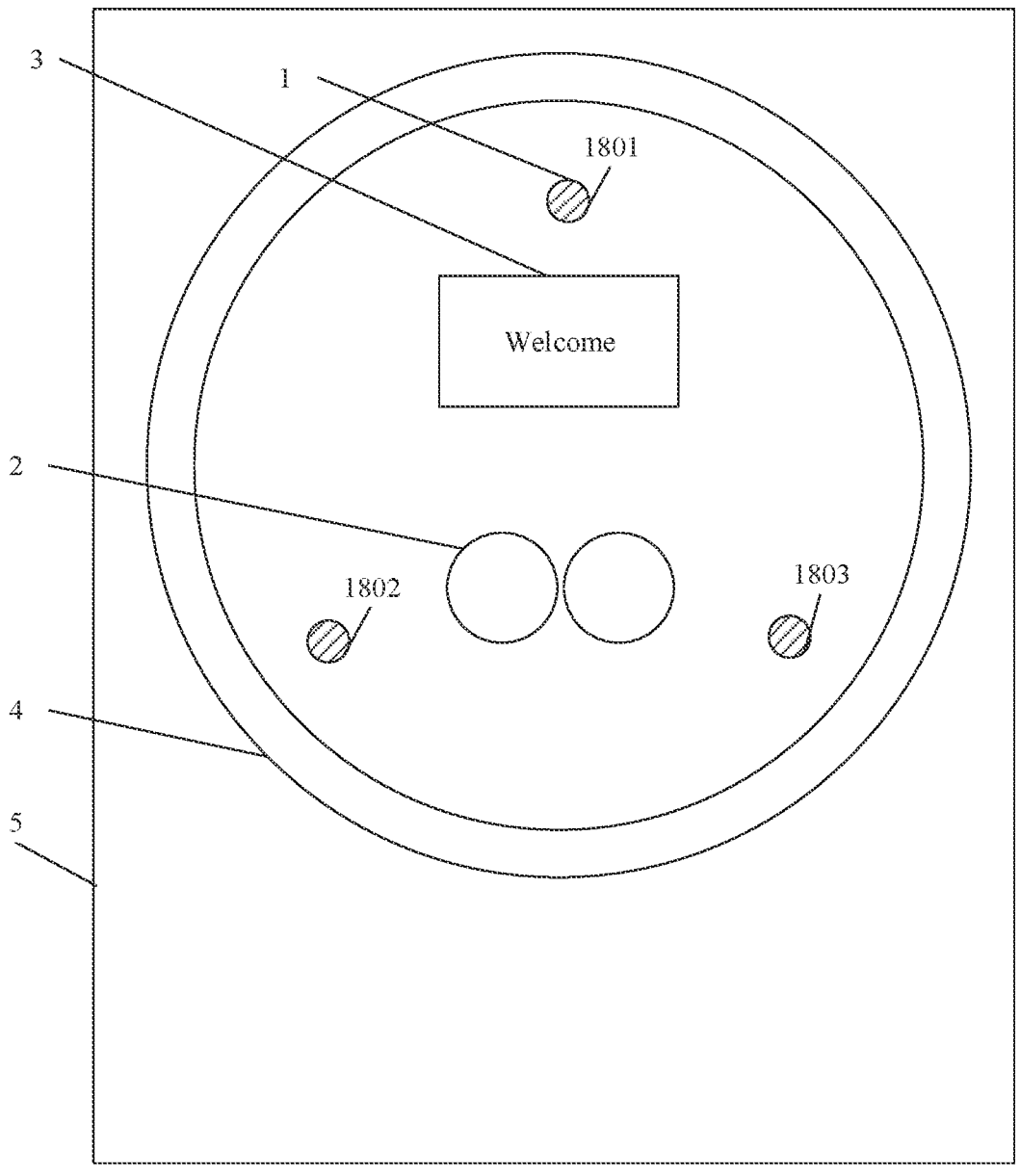
FIG. 18 is a schematic diagram of arrangement of proximity sensors according to an exemplary embodiment of this application.

For another example, in the case of three proximity sensors, the three proximity sensors are arranged at locations in a triangular shape; or the three proximity sensors are arranged at an upper left location, a lower left location, and an upper right location; or the three proximity sensors are arranged at an upper left location, an upper right location, and a lower right location; or the three proximity sensors are arranged at an upper left location, a lower left location, and a lower right location; or the three proximity sensors are arranged at a lower left location, an upper right location, and a lower right location. For example, as shown in FIG. 18, the three proximity sensors are an upper sensor 1801, a lower-left sensor 1802, and a lower-right sensor 1803. For example, when the three proximity sensors are arranged in a triangular shape, an offset swipe action in a left/right direction is recognized by the lower-left proximity sensor and the lower-right proximity sensor, and an offset swipe action in an up/down direction is recognized by the upper proximity sensor, the lower-left proximity sensor, and the lower-right proximity sensor.

For another example, in the case of four proximity sensors, the four proximity sensors are arranged in a rectangular shape at an upper left location, a lower left location, an upper right location, and a lower right location; or the four proximity sensors are arranged in a rhombic shape at an upper location, a lower location, a left location, and a right location. For example, as shown in FIG. 1, the four proximity sensors are an upper-left proximity sensor 101, a lower-left proximity sensor 102, an upper-right proximity sensor 103, and a lower-right proximity sensor 104.

Arrangement of the proximity sensors is not limited to the foregoing examples. This is not specifically limited in the embodiments of this application.

A person skilled in the art may understand that the structure shown in FIG. 16 constitutes no limitation on the palm-based interaction device 1600, and the palm-based interaction device may include more or fewer components than those shown in the figure, or some components may be combined, or a different component layout may be used.

An embodiment of this application further provides a palm-based interaction device. The palm-based interaction device includes a processor, a memory, and at least two proximity sensors. The at least two proximity sensors capture sensor data of a palm and store the sensor data of the palm in the memory. The memory stores at least one program, and the at least one program is loaded and executed by the processor to implement the palm-based human-computer interaction method provided in the foregoing method embodiments.

An embodiment of this application further provides a non-transitory computer-readable storage medium, the storage medium storing at least one computer program, and the at least one computer program being loaded and executed by a processor to implement the palm-based human-computer interaction method provided in the foregoing method embodiments.

An embodiment of this application further provides a computer program product, the computer program product including a computer program, the computer program being stored in a computer-readable storage medium, and a processor of a palm-based interaction device reading the computer program from the computer-readable storage medium and executing the computer program, so that the palm-based interaction device performs the palm-based human-computer interaction method provided in the foregoing method embodiments.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A palm-based human-computer interaction method performed by a computer device, and the method comprising:

obtaining sensor data of a palm that is captured by at least two proximity sensors and a palm image of the palm captured by at least one camera, the at least two proximity sensors and the at least one camera being disposed in an array on a surface of the computer device, wherein a first proximity sensor is disposed on a first side of the at least one camera and a second proximity sensor is disposed on a second side of the at least one camera opposite to the first side;

verifying an identity of the palm based on the palm image;

in accordance with a determination that the identity of the palm is registered:

recognizing a hovering interaction of the palm based on the sensor data of the palm;

performing a first response operation when the hovering interaction action is an offset swipe action in which the sensor data of the palm indicates that the palm moves from the first proximity sensor to the second proximity sensor while a variation value of a distance between the palm and the surface of the computer device is less than a variation threshold during the movement; and performing a second response operation when the hovering interaction action is a forward/backward tap action in which the sensor data of the palm indicates that at least two distance measurement values of the palm by the at least two proximity sensors simultaneously changes in a first direction within a first time period and remain substantially unchanged within a second time period after the first time period, wherein the second response operation is different from the first response operation.

2. The method according to claim 1, wherein the performing the first response operation for the offset swipe action comprises:

determining a swipe direction of the offset swipe action based on an action parameter value of the offset swipe action in the sensor data; and performing the first response operation based on the swipe direction.

3. The method according to claim 2, wherein the determining a swipe direction of the offset swipe action based on an action parameter value of the offset swipe action in the sensor data comprises:

in response to that the palm enters a first location region, determining a location of the palm in the first location region as a starting point;

in response to that the palm moves from the first location region to a second location region, determining a location of the palm in the second location region as an ending point; and when time taken by the palm to move from the starting point to the ending point is less than a first time threshold, determining a direction from the starting point to the ending point as the swipe direction.

4. The method according to claim 1, wherein the performing the second response operation for the forward/backward tap action comprises:

determining an operation category of the forward/backward tap action based on an action parameter value of the forward/backward tap action in the sensor data; and performing the second response operation based on the operation category.

5. The method according to claim 1, wherein the computer device further comprises a display screen, and the method further comprises:

displaying the first response operation for the offset swipe action on the display screen; and displaying the second response operation for the forward/backward tap action on the display screen.

6. The method according to claim 1, wherein the method further comprises:

determining an object identifier for the palm based on the palm image; and entering an interaction mode when the object identifier is determined and dwell time of the palm in a second measurement region of the proximity sensor is greater than a dwell time threshold.

7. The method according to claim 6, wherein the camera comprises a color camera and an infrared camera;

the obtaining the palm image of the palm by the at least one camera comprises:

obtaining a color image of the palm by using the color camera, the color image being an image obtained by the color camera by imaging the palm based on natural light; and obtaining an infrared image of the same palm by using the infrared camera, the infrared image being an image obtained by the infrared camera by imaging the palm based on infrared light; and the determining the object identifier for the palm based on the palm image comprises:

recognizing the palm based on the color image and the infrared image to determine the object identifier for the palm.

8. A computing device comprising a processor, a memory, and at least two proximity sensors, the at least two proximity sensors capturing sensor data of a palm and storing the sensor data of the palm in the memory, the memory further storing at least one computer program, and the at least one computer program being loaded and executed by the processor and causing the computer device to implement a palm-based human-computer interaction method including:

obtaining sensor data of a palm that is captured by at least two proximity sensors and a palm image of the palm captured by at least one camera, the at least two proximity sensors and the at least one camera being disposed in an array on a surface of the computer device, wherein a first proximity sensor is disposed on a first side of the at least one camera and a second proximity sensor is disposed on a second side of the at least one camera opposite to the first side;

verifying an identity of the palm based on the palm image;

in accordance with a determination that the identity of the palm is registered:

recognizing a hovering interaction of the palm based on the sensor data of the palm;

performing a first response operation when the hovering interaction action is an offset swipe action in which the sensor data of the palm indicates that the palm moves from the first proximity sensor to the second proximity sensor while a variation value of a distance between the palm and the surface of the computer device is less than a variation threshold during the movement; and performing a second response operation when the hovering interaction action is a forward/backward tap action in which the sensor data of the palm indicates that at least two distance measurement values of the palm by the at least two first proximity sensors simultaneously changes in a first direction within a first time period and remain substantially unchanged within a second time period after the first time period, wherein the second response operation is different from the first response operation.

9. The computer device according to claim 8, wherein the performing the first response operation for the offset swipe action comprises:

determining a swipe direction of the offset swipe action based on an action parameter value of the offset swipe action in the sensor data; and performing the first response operation based on the swipe direction.

10. The computer device according to claim 9, wherein the determining a swipe direction of the offset swipe action based on an action parameter value of the offset swipe action in the sensor data comprises:

in response to that the palm enters a first location region, determining a location of the palm in the first location region as a starting point;

in response to that the palm moves from the first location region to a second location region, determining a location of the palm in the second location region as an ending point; and when time taken by the palm to move from the starting point to the ending point is less than a first time threshold, determining a direction from the starting point to the ending point as the swipe direction.

11. The computer device according to claim 8, wherein the performing the second response operation for the forward/backward tap action comprises:

determining an operation category of the forward/backward tap action based on an action parameter value of the forward/backward tap action in the sensor data; and performing the second response operation based on the operation category.

12. The computer device according to claim 8, wherein the computer device further comprises a display screen, and the method further comprises:

displaying the first response operation for the offset swipe action on the display screen; and displaying the second response operation for the forward/backward tap action on the display screen.

13. The computer device according to claim 8, wherein the method further comprises:

determining an object identifier for the palm based on the palm image; and entering an interaction mode when the object identifier is determined and dwell time of the palm in a second measurement region of the proximity sensor is greater than a dwell time threshold.

14. The computer device according to claim 13, wherein the camera comprises a color camera and an infrared camera;

the obtaining the palm image of the palm by the at least one camera comprises:

obtaining a color image of the palm by using the color camera, the color image being an image obtained by the color camera by imaging the palm based on natural light; and obtaining an infrared image of the same palm by using the infrared camera, the infrared image being an image obtained by the infrared camera by imaging the palm based on infrared light; and the determining the object identifier for the palm based on the palm image comprises:

recognizing the palm based on the color image and the infrared image to determine the object identifier for the palm.

15. A non-transitory computer-readable storage medium storing at least one computer program, and the at least one computer program being loaded and executed by a processor of a computer device and causing the computer device to implement a palm-based human-computer interaction method including:

obtaining sensor data of a palm that is captured by at least two proximity sensors and a palm image of the palm captured by at least one camera, the at least two proximity sensors and the at least one camera being disposed in an array on a surface of the computer device, wherein a first proximity sensor is disposed on a first side of the at least one camera and a second proximity sensor is disposed on a second side of the at least one camera opposite to the first side;

verifying an identity of the palm based on the palm image;

in accordance with a determination that the identity of the palm is registered:

recognizing a hovering interaction of the palm based on the sensor data of the palm;

performing a first response operation when the hovering interaction action is an offset swipe action in which the sensor data of the palm indicates that the palm moves from the first proximity sensor to the second proximity sensor while a variation value of a distance between the palm and the surface of the computer device is less than a variation threshold during the movement; and performing a second response operation when the hovering interaction action is a forward/backward tap action in which the sensor data of the palm indicates that at least two distance measurement values of the palm by the at least two first proximity sensors simultaneously changes in a first direction within a first time period and remain unchanged within a second time period after the first time period, wherein the second response operation is different from the first response operation.

16. The non-transitory computer-readable storage medium according to claim 15, wherein the performing the first response operation for the offset swipe action comprises:

determining a swipe direction of the offset swipe action based on an action parameter value of the offset swipe action in the sensor data; and performing the first response operation based on the swipe direction.

17. The non-transitory computer-readable storage medium according to claim 15, wherein the performing the second response operation for the forward/backward tap action comprises:

determining an operation category of the forward/backward tap action based on an action parameter value of the forward/backward tap action in the sensor data; and performing the second response operation based on the operation category.

18. The non-transitory computer-readable storage medium according to claim 15, wherein the computer device further comprises a display screen, and the method further comprises:

displaying the first response operation for the offset swipe action on the display screen; and displaying the second response operation for the forward/backward tap action on the display screen.

19. The non-transitory computer-readable storage medium according to claim 15, wherein the method further comprises:

determining an object identifier for the palm based on the palm image; and entering an interaction mode when the object identifier is determined and dwell time of the palm in a second measurement region of the proximity sensor is greater than a dwell time threshold.

20. The non-transitory computer-readable storage medium according to claim 19, wherein the camera comprises a color camera and an infrared camera;

the obtaining the palm image of the palm by the at least one camera comprises:

obtaining a color image of the palm by using the color camera, the color image being an image obtained by the color camera by imaging the palm based on natural light; and obtaining an infrared image of the same palm by using the infrared camera, the infrared image being an image obtained by the infrared camera by imaging the palm based on infrared light; and the determining the object identifier for the palm based on the palm image comprises:

recognizing the palm based on the color image and the infrared image to determine the object identifier for the palm.

* * * * *